US011236778B2

(12) United States Patent
Size, Jr.

(10) Patent No.: US 11,236,778 B2
(45) Date of Patent: Feb. 1, 2022

(54) MULTI-PIECE ANTI-VIBRATION LOCKING FASTENER HAVING COAXIALLY ARRANGED INNER AND OUTER OPPOSITE THREADED BOLTS IN COMBINATION WITH SUCCESSIVE AND OPPOSITE THREADED PROFILES WITHIN A THICKENED BASE LAYER

(71) Applicant: Earl Allen Size, Jr., Rochester Hills, MI (US)

(72) Inventor: Earl Allen Size, Jr., Rochester Hills, MI (US)

(*) Notice: Subject to any disclaimer, the term of this patent is extended or adjusted under 35 U.S.C. 154(b) by 109 days.

(21) Appl. No.: 16/869,718

(22) Filed: May 8, 2020

(65) Prior Publication Data

US 2020/0291983 A1 Sep. 17, 2020

Related U.S. Application Data

(63) Continuation-in-part of application No. 16/507,104, filed on Jul. 10, 2019, now Pat. No. 11,168,729.

(60) Provisional application No. 62/816,964, filed on Mar. 12, 2019.

(51) Int. Cl.
*F16B 19/04* (2006.01)
*F16B 39/30* (2006.01)

(52) U.S. Cl.
CPC .................................. *F16B 39/30* (2013.01)

(58) Field of Classification Search
CPC ............................. F16B 41/002; F16B 39/028
USPC ................. 411/140, 395, 546, 243, 244, 510
See application file for complete search history.

(56) References Cited

U.S. PATENT DOCUMENTS

| 885,544 A | 4/1908 | Summons |
| 893,081 A | 7/1908 | Kunan |
| 932,395 A | 8/1909 | Kenney |

(Continued)

FOREIGN PATENT DOCUMENTS

| EP | 0178787 A2 | 4/1986 |
| EP | 0634583 A1 | 1/1995 |

(Continued)

OTHER PUBLICATIONS

International Search Report and Written Opinion issued by the Korean Intellectual Property Office as International Searching Authority for Application PCT/US2020/013335 dated May 15, 2020 (9 pages).

*Primary Examiner* — Gary W Estremsky
(74) *Attorney, Agent, or Firm* — Dinsmore & Shohl LLP

(57) ABSTRACT

A multi-piece locking fastener assembly including a thickened base layer having a first wider diameter passageway exhibiting a first interiorly threaded orientation and a second narrower diameter passageway exhibiting a second opposite threaded orientation and extending a distance in communication with and beyond a bottom end wall of the first wider passageway. A first bolt fastener has a first arrangement of exterior threads engageable with the wider diameter passageway of the base layer. The first fastener further includes an interior passageway. Following installation of the wider fastener into the base layer, a second narrower diameter bolt fastener having at least a partially threaded stem is threadably inter-engaged with the second passageway in the base layer to prevent loosening of either fastener via their counter-threaded orientations.

5 Claims, 21 Drawing Sheets

(56) References Cited

U.S. PATENT DOCUMENTS

| | | | | |
|---|---|---|---|---|
| 1,097,257 A | * | 5/1914 | Newton | F16B 39/16 411/243 |
| 1,138,574 A | | 5/1915 | King | |
| 1,357,331 A | * | 11/1920 | Le Fauve | F16B 5/0233 411/228 |
| 1,368,106 A | * | 2/1921 | Brandt | F16B 39/04 411/200 |
| 1,399,191 A | | 12/1921 | Casali | |
| 1,528,652 A | * | 3/1925 | Briais | F16B 39/16 411/244 |
| 2,336,164 A | * | 12/1943 | Chaskin | F16B 39/16 411/243 |
| 2,956,293 A | | 10/1960 | McKay | |
| 3,222,977 A | | 12/1965 | Vaughn | |
| 4,043,239 A | * | 8/1977 | DeFusco | F16B 37/00 411/337 |
| 4,253,509 A | | 3/1981 | Collet | |
| 5,314,279 A | | 5/1994 | Ewing | |
| 5,333,976 A | * | 8/1994 | Dobbrunz | F16B 5/0233 411/263 |
| 5,391,032 A | | 2/1995 | Vassalotti | |
| 5,544,991 A | | 8/1996 | Richardson | |
| 5,562,379 A | | 10/1996 | Rausch et al. | |
| 5,855,463 A | * | 1/1999 | Newby | F16B 39/18 411/244 |
| 6,357,953 B1 | * | 3/2002 | Ballantyne | F16B 5/0233 403/365 |
| 6,676,874 B1 | | 1/2004 | Muller | |
| 6,789,993 B2 | * | 9/2004 | Ozawa | F16B 5/0233 411/432 |
| 7,857,567 B2 | | 12/2010 | Iwata et al. | |
| 8,113,754 B2 | | 2/2012 | Dahl et al. | |
| 8,202,033 B2 | * | 6/2012 | Choi | B62D 27/065 411/546 |
| 8,267,630 B2 | | 9/2012 | Moon et al. | |
| 8,398,349 B2 | | 3/2013 | Jackson | |
| 8,402,605 B2 | | 3/2013 | Courtin et al. | |
| 2005/0025607 A1 | * | 2/2005 | Guantonio | F16B 39/12 411/222 |
| 2008/0056809 A1 | | 3/2008 | Kielczewski et al. | |
| 2012/0251263 A1 | * | 10/2012 | Hsieh | F16B 39/02 411/140 |
| 2017/0021478 A1 | | 1/2017 | Junkers et al. | |
| 2019/0003513 A1 | | 1/2019 | Junkers et al. | |

FOREIGN PATENT DOCUMENTS

| | | |
|---|---|---|
| JP | 07-004418 A | 1/1995 |
| JP | 07004418 A | 1/1995 |
| JP | 08-232932 A | 9/1996 |
| JP | H8232932 A | 9/1996 |
| JP | 3137118 U | 11/2007 |
| JP | 2009-204153 A | 9/2009 |
| JP | 2009204153 U | 9/2009 |
| WO | 2015054722 A1 | 4/2015 |

* cited by examiner

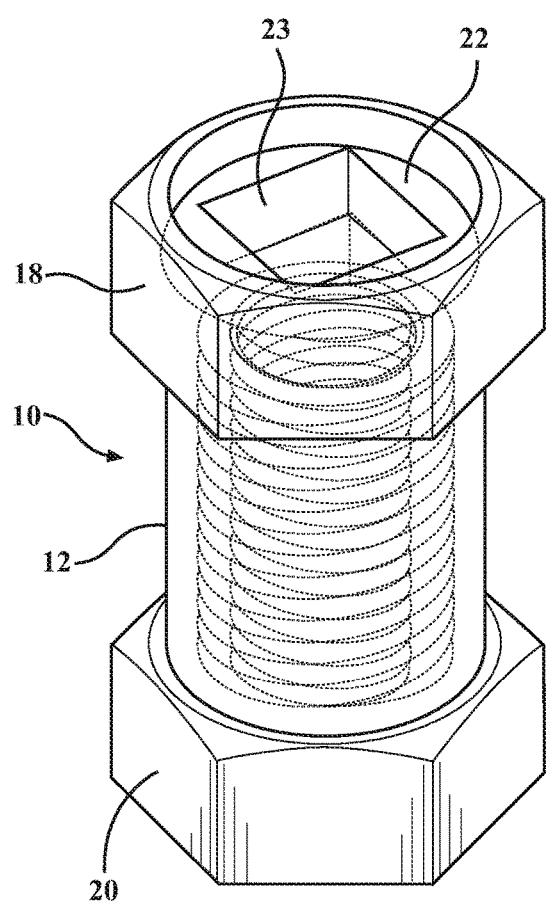
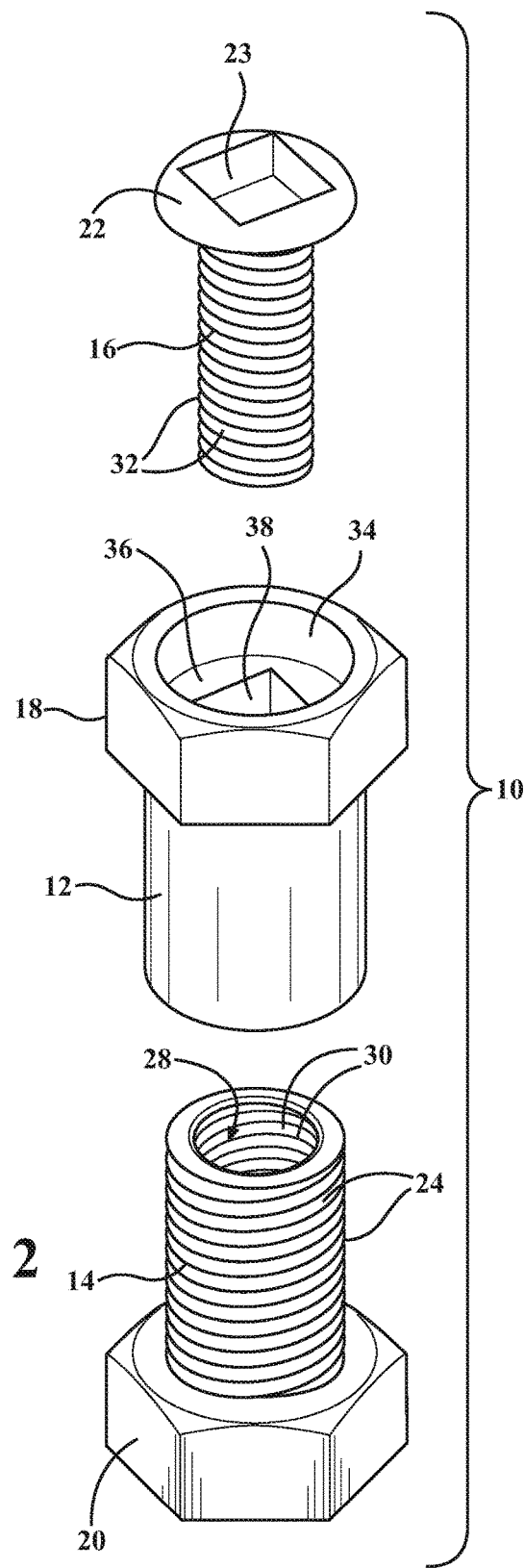
FIG. 1
FIG. 2

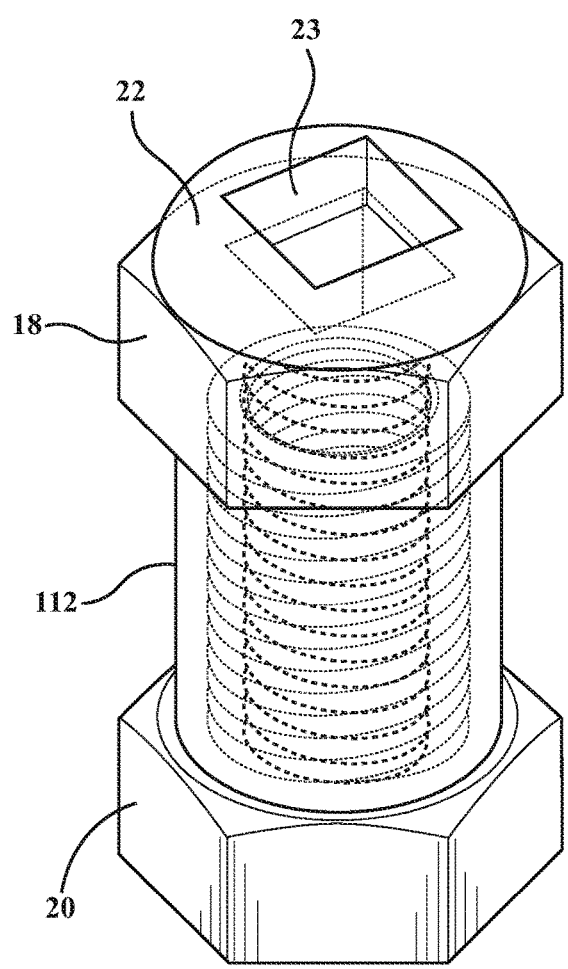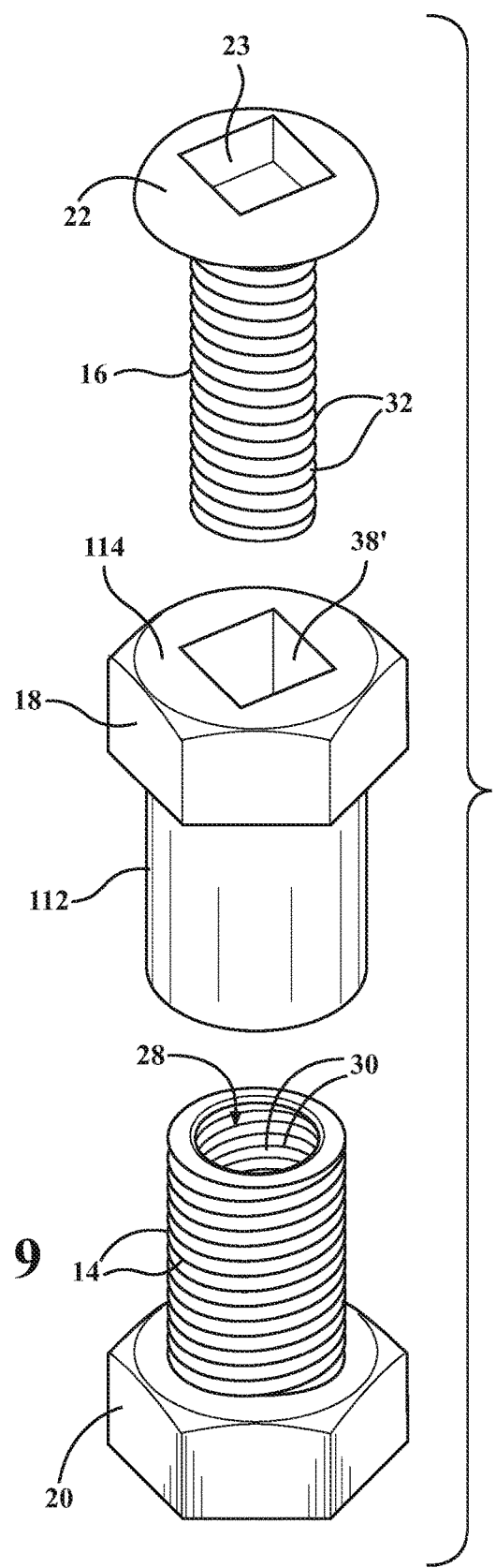

FIG. 13
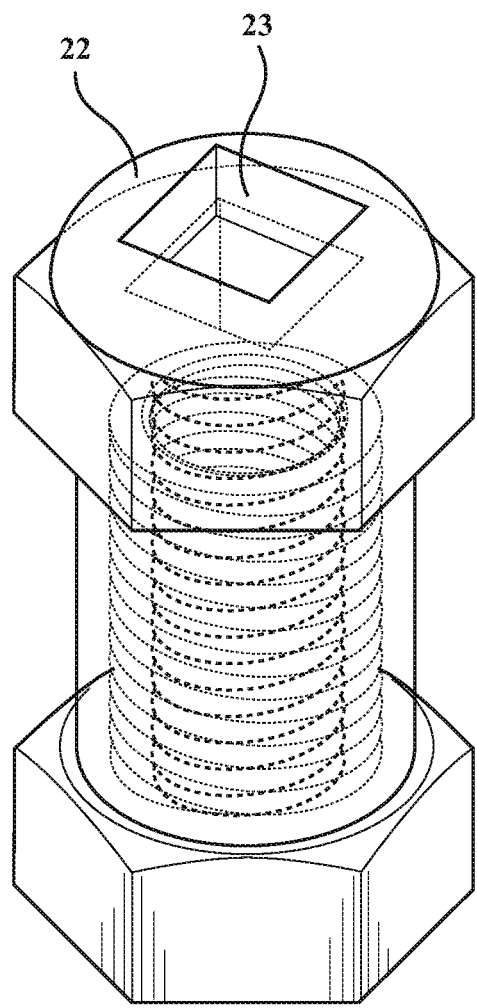
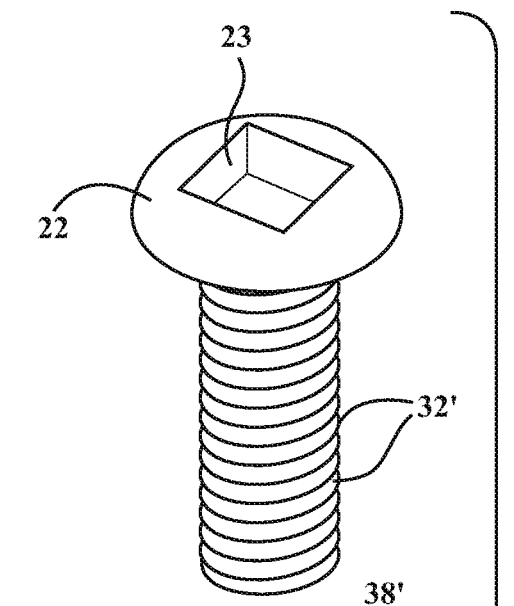
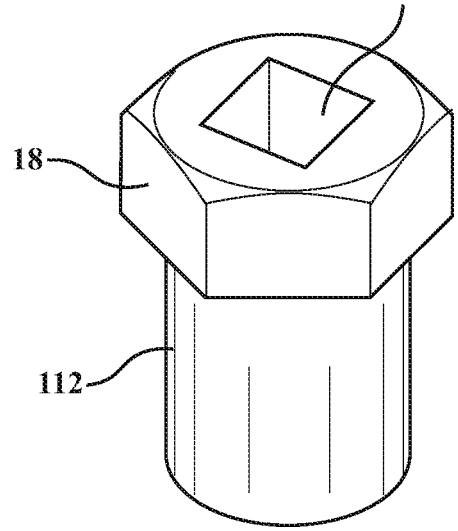
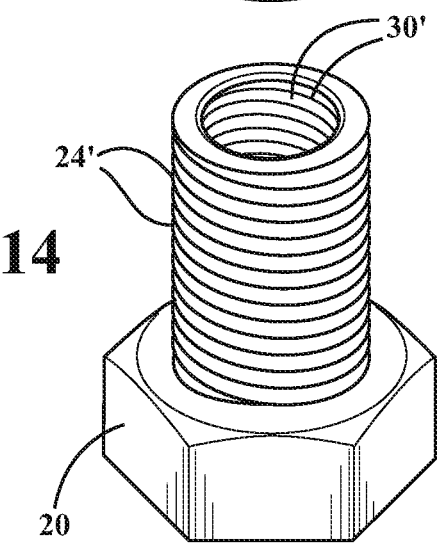
FIG. 14

FIG. 22
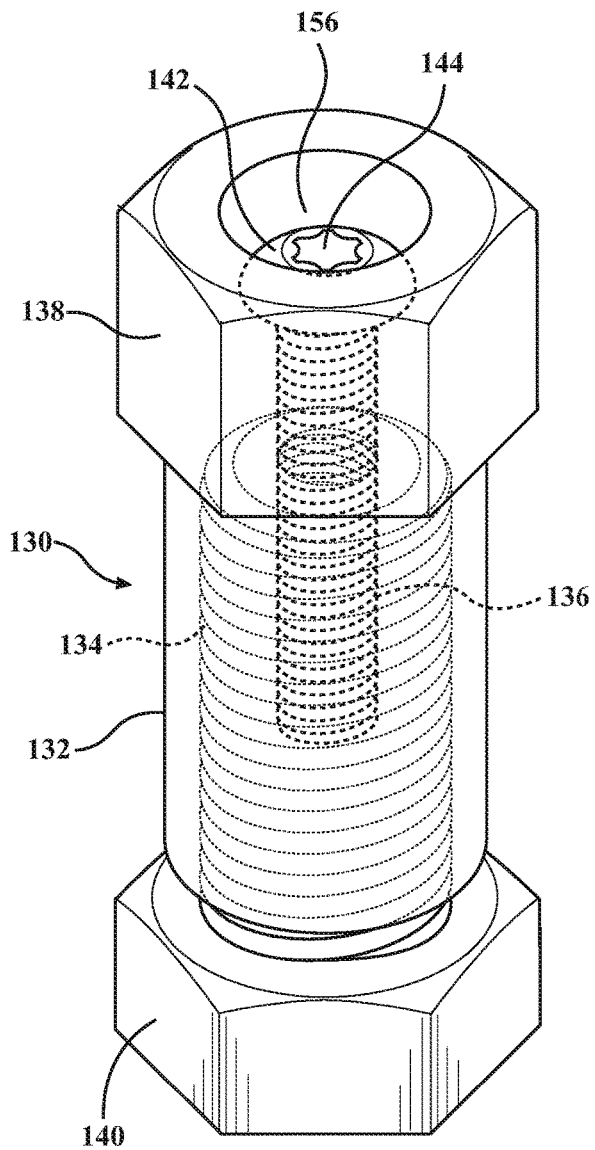
FIG. 23
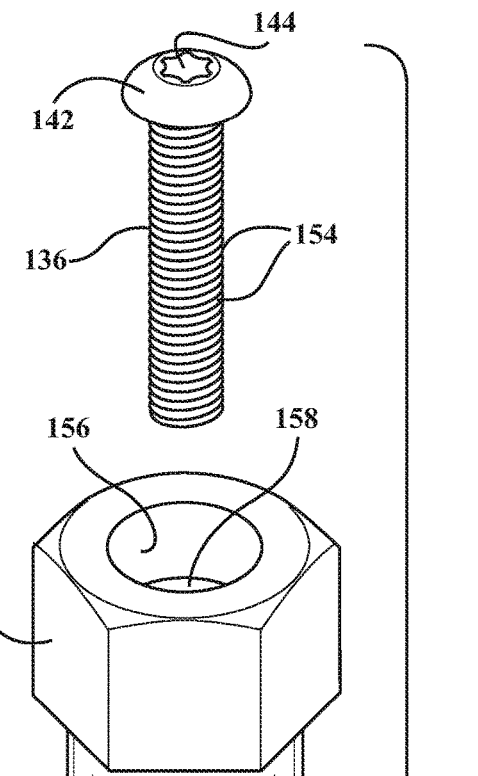
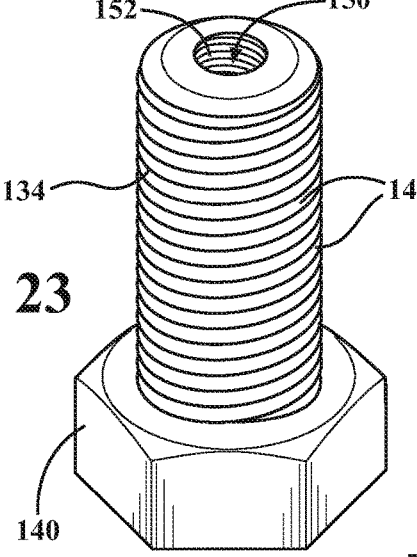

MULTI-PIECE ANTI-VIBRATION LOCKING FASTENER HAVING COAXIALLY ARRANGED INNER AND OUTER OPPOSITE THREADED BOLTS IN COMBINATION WITH SUCCESSIVE AND OPPOSITE THREADED PROFILES WITHIN A THICKENED BASE LAYER

CROSS-REFERENCE TO RELATED APPLICATIONS

The present application is a continuation in part of and claims the priority of U.S. Ser. No. 16/507,104 filed Jul. 10, 2019. The '014 application claims the priority of provisional U.S. Ser. No. 62/816,964 filed Mar. 12, 2019.

FIELD OF THE INVENTION

The present invention relates generally to locking fasteners. More specifically, the present invention discloses multi-piece locking fasteners which are provided with counter threaded profiles and which, when installed relative to an intermediate piece or base layer material, prevents loosening of the fastener assembly given the counter-threaded orientations of the first and second fasteners which prevent loosening of the assembly.

In a first embodiment, a three piece configuration includes the intermediate piece or component which is interiorly threaded and open at opposite ends for receiving and first and second opposing directed and threaded screws. The first screw is exteriorly threaded for engaging with the threads of the intermediate component. The first screw also includes a hollow shaft which, upon being installed within a first end of the intermediate component, subsequently receives in a counter-rotatatively threaded fashion the second threaded screw, with loosening of either the opposing and inter-seating end screws being prevented via their counter-threaded orientations.

In a second embodiment, the intermediate component of the first embodiment is reconfigured as a thickened base layer, within which is configured a first wider diameter passageway exhibiting a first interiorly threaded orientation. A second narrower diameter passageway exhibits a second opposite threaded orientation and extends a distance in communication with and beyond a bottom end wall of the first wider passageway.

A first redesigned elongated and wider diameter bolt style fastener includes a head and a stem, the stem having a first arrangement of exterior threads threadably inter-engageable with the threads configured within the wider diameter passageway of the base layer. The first fastener further includes a further interior passageway extending its axial length (head and stem), and which can be optionally threaded along any of a partial or entire length in a counter direction relative to the exterior threads.

A second narrower diameter bolt style fastener includes a head and a partially or fully threaded stem and, following the wider diameter fastener being installed into the base layer to secure there-against any second and typically thinner layer, the second fastener being dimensioned to be installed through the interior passageway of the wider fastener. Upon being fully installed, the end most portion of the inner fastener stem projects beyond a stem end face of the wider fastener and abutting end wall within the inner layer and is threadably inter-engaged with the further extended counter oriented second narrower diameter passageway. In this manner, loosening of either the opposing coaxial seating bolt fasteners is prevented via their counter-threaded orientations.

BACKGROUND OF THE INVENTION

The prior art is documented with examples of fasteners, such as which are configured in an attempt to prevent loosening when employed in dynamic environments. A first and most basic example of this is the conventional threaded bolt fastener with attachable and interiorly threaded nut. A spring washer can either be integrated into the nut or separately provided.

Other examples include the locking threaded fastener of Ewing, U.S. Pat. No. 5,314,279, which teaches a locking threaded fastener of the wedge-action type with threaded and threadless nut members with wedge elements therebetween for wedging the nut members apart when the threaded nut member is turned in the loosening direction. In a two-piece nut, the threadless nut member has a flat inner surface for engaging the workpiece and the wedge elements have engaging surfaces with a coefficient of friction therebetween which is less than that between the flat inner surface and the workpiece surface. In a three-piece nut, a third nut member, in the form of a washer, is provided with a flat inner surface for engaging the workpiece. The wedge elements have engaging surfaces with a coefficient of friction less than that between the third nut member and the threadless nut member which, in turn, is less than that between the third nut member in the workpiece.

U.S. Pat. No. 5,562,379, to Rausch et al., teaches a vibration resistant fastener having a pin and a collar. The pin is threaded or peripherally grooved. At a central location, the major diameter of the thread or groove is reduced to a diameter which is still larger than its minor diameter. A collar is threaded or swaged on to the pin and collar material is pressed into an open region that was formed by the reduction of the major diameter, to form a thread lock.

U.S. Pat. No. 5,564,875, to Matthews, teaches a locking fastener (10) having a nut (12) with a threaded portion (14) formed about a central axis (16) of the fastener. A head portion (18) of the nut is formed integral to the threaded portion (14), for gripping the fastener during tightening or loosening. An inner member (22) is provided coaxial with the head portion (18) and is designed to be mechanically coupled to an underside of the head portion (18) so as to be substantially immobile relative to the head portion. The inner member (22) is provided with inclined cam means (24) in the form of a plurality of cam surfaces arranged in an annular configuration about the inner member (22). A locking member (26) is provided coaxial with the threaded portion (14) and has a matching cam means (28) on one face adapted to rotatably interengage in facing relation with the inclined cam means (24) on inner member (22).

Matthews 875' further depicts a first pressure transmitting surface (30) on the opposite face of the locking member (26) which is rotatably received in facing relation to a second pressure transmitting surface (34) provided on an outer member (32). The outer member (32) is coaxial with the locking member (26). A solid friction reducing material in the form of an annulus (36) is located between the first pressure transmitting surface (30) of the locking member (26) and the second pressure transmitting surface (34) of the outer member (32). In use, the outer member (32) can be held stationary relative to a fastened object so that the friction reducing annulus (36) can act as a bearing for the head portion (18) during tightening or loosening of the fastener and when the fastener has been tightened and the locking member has been locked in position relative to the outer member (32), inadvertent loosening of the head portion (18) due to vibration can be inhibited by the interengaging cam means (24, 28).

SUMMARY OF THE PRESENT INVENTION

As previously described, the present invention discloses multi-piece locking fasteners which are provided with counter threaded profiles and which, when installed relative to an intermediate piece or base layer material, prevents loosening of the fastener assembly given the counter-threaded orientations of the first and second fasteners which prevent loosening of the assembly. In a first embodiment, a three piece locking fastener includes an interiorly threaded intermediate component open at opposite ends. A first screw having a first exterior thread pattern rotationally inter-engages with the interior threads of the intermediate component when installed through a first selected one of the opposite ends, the first screw having a hollow shaft exhibiting a further plurality of interior threads matching a direction of the first thread pattern. A second screw has a second exterior thread pattern opposite the first pattern and, upon being installed within the other selected one of the opposite ends, rotationally inter-engages the interior threads of the first screw, so that loosening of either of the first and second screws being prevented by their counter-threaded orientation.

Additional features include each of the intermediate component and a selected one of the first and second screws having an enlarged head with a number of interconnected sides having a polygonal shape. The second screw further includes a curved and enlarged diameter head.

Other features include a tool bit engageable recess profile incorporated into the enlarged head. The intermediate component further includes an end proximate undercut recess for receiving the enlarged head of the second fastener. A recessed ledge is configured within the undercut recess of the intermediate component for seating an underside of the enlarged head of the second fastener in an installed position. A polygonal inner perimeter can be configured in the undercut recess for communicating an extending stem of the second fastener within the intermediate component and in engagement with the hollow threaded interior of the previously installed first fastener.

Yet additional features include the intermediate component and the first and second fasteners each further including a rigid material not limited to a steel or heavy duty nylon construction. The first and second layers have aligning apertures through which a stem portion of the intermediate component extends, with the enlarged polygonal shaped heads established by the intermediate component and the selected one of the first and second screws compressing against opposite edge surfaces of the layers adjoining the apertures.

In a second embodiment, the intermediate component of the first embodiment is reconfigured as a thickened base layer, such as a steel or other suitable rigid metal, and within which is configured a first wider diameter passageway exhibiting a first interiorly threaded orientation. A second narrower diameter passageway exhibits a second opposite threaded orientation and extends a selected distance within the base layer in communication with and beyond a bottom end wall of the first wider passageway.

A first redesigned elongated and wider diameter bolt style fastener is provided and includes a head and a stem, the stem having a first arrangement of exterior threads threadably inter-engageable with the threads configured within the wider diameter passageway of the base layer. The first fastener further includes a further interior passageway extending its axial length (head and stem), and which can be optionally threaded along any of a partial or entire length in a counter direction relative to the exterior threads.

A second narrower diameter bolt style fastener includes a head and a partially or fully threaded stem and, following the wider diameter fastener being installed into the base layer to secure there-against any second and typically thinner layer, the second fastener being dimensioned to be installed through the interior passageway of the wider screw. Upon being fully installed, the end most portion of the inner fastener stem projects beyond a stem end face of the wider fastener and abutting end wall within the inner layer and is threadably inter-engaged with the further extended counter oriented second narrower diameter passageway. In this manner, loosening of either the opposing coaxial seating bolt fasteners is prevented via their counter-threaded orientations.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is an assembled and partially transparent view of a three piece fastener according to a first variant of the present invention;

FIG. 2 is an exploded view depicting the three piece fastener of FIG. 1 with the intermediate component and first (bottom) hollow screw and second (top solid screw);

FIG. 8 is an assembled and partially transparent view of a three piece fastener according to a second variant of the present invention;

FIG. 9 is an exploded view depicting the three piece fastener of FIG. 8 exhibiting an alternately configured intermediate component with a non-recessed upper end in comparison to that shown in FIG. 1, in combination with a first (bottom) hollow screw and second (top solid screw) exhibiting reverse thread directions;

FIG. 13 is an assembled and partially transparent view of a three piece fastener as substantially shown in FIG. 6 with the direction of the first and second screw threads being reversed;

FIG. 14 is an exploded view depicting the three piece fastener of FIG. 9, again with the intermediate component and first (bottom) hollow screw and second (top solid screw) and reverse thread patterns exhibited on the top and bottom screws;

FIG. 22 is an assembled and partially transparent view of a three piece fastener according to a further embodiment of the present invention;

FIG. 23 is an exploded view depicting the three piece fastener of FIG. 22;

DETAILED DESCRIPTION OF THE PREFERRED EMBODIMENTS

Figure 4:
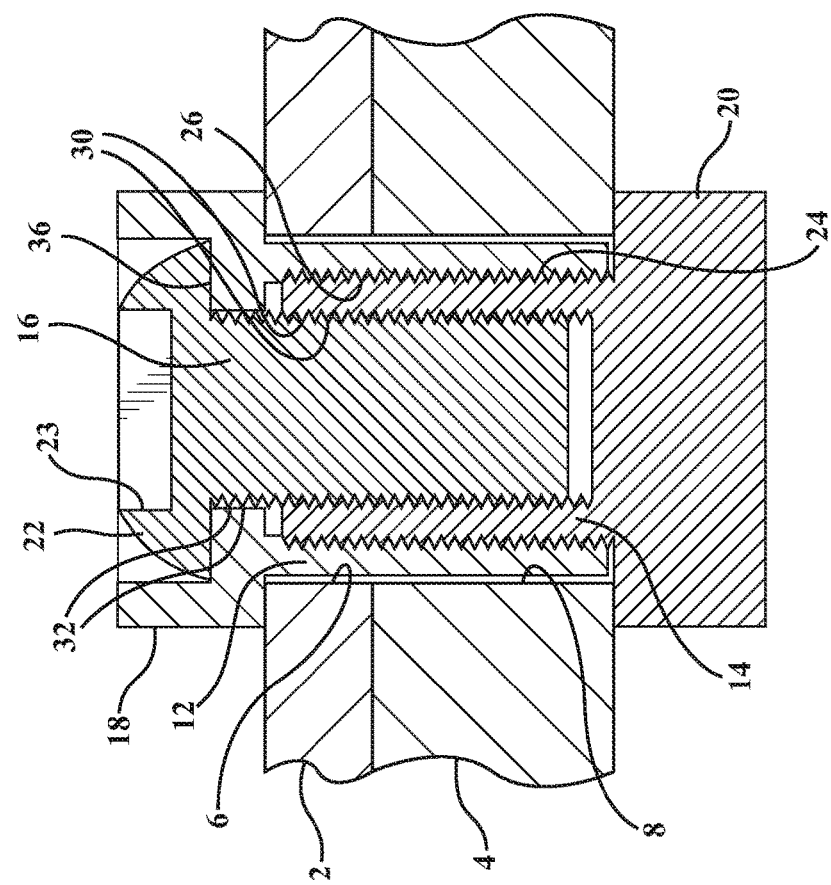
FIG. 4 is an axial cutaway view depicting the assembly of FIG. 1.

With reference to the following illustrations, the present invention discloses a three piece locking fastener for use such as in dynamic environments in which vibrations and other effects are in play. This can include without limitation such operating environments as skate blade fasteners for compressively attaching a first blade layer to a second layer, such as further including a support plate or the like formed with the bottom of the skate. Other applications include the three piece fastener being integrated into a wheel to hub attachment interface, such as for a vehicle.

As will be further detailed in reference to each of the alternate variants, the fastener assembly includes, at a minimum, an intermediate component which is interiorly threaded and open at opposite ends for receiving and first and second threaded screws. The first screw is exteriorly threaded for engaging with the threads of the intermediate component. The first screw includes a hollow shaft which, upon being installed within a first end of the intermediate component, subsequently receives in a counter-rotatatively threaded fashion a second threaded screw, with loosening of the opposing end screws being prevented via their counter-threaded orientation.

Referring initially to FIG. 1, generally depicted at 10 is an assembled and partially transparent view of a three piece fastener according to a first variant of the present invention. As further shown in the exploded view of FIG. 2, the three piece fastener includes intermediate component 12 and first (bottom) hollow screw 14 and second (top) solid screw 16. Consistent with all of the variants, the intermediate component 12 and first 14 and second 16 fasteners can be constructed of any rigid material not limited to steel, carbon steel or any durable composite (e.g. nylon or polymer) material. As further understood, the screws 14 and 16 are also commonly termed as "threaded bolts" however can include any other suitable configuration for inter-engaging with the intermediate component 12 in the manner described herein.

Figure 3:
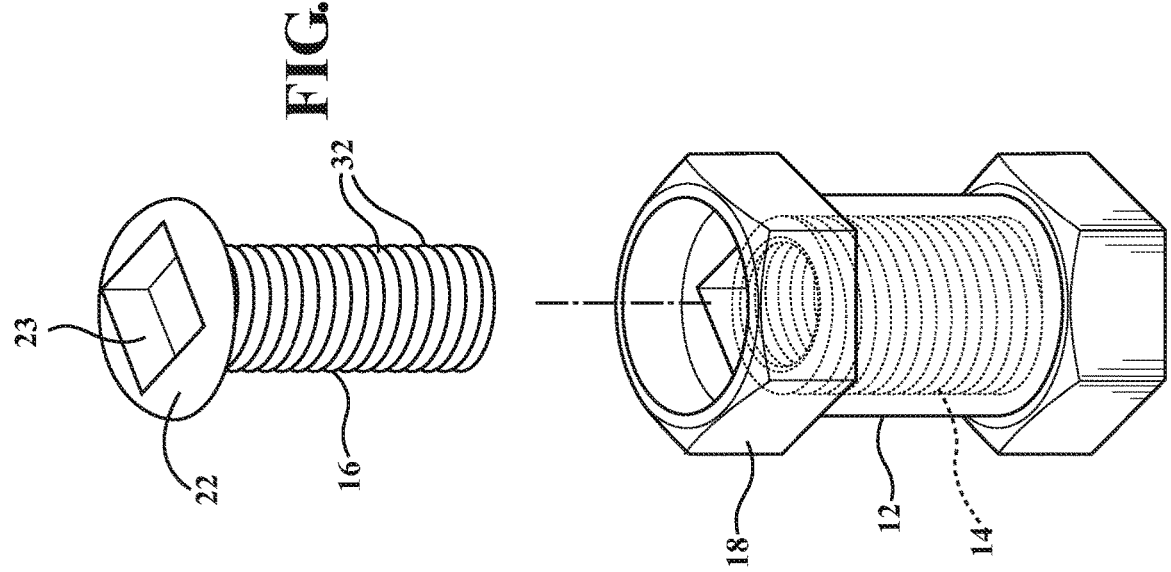
FIG. 3 is a partially exploded view of FIG. 1 and illustrating the lower or first hollowed screw engaged within the lower open and interiorly threaded end of the intermediate component prior to engagement of the upper or second solid screw.
Figure 5:
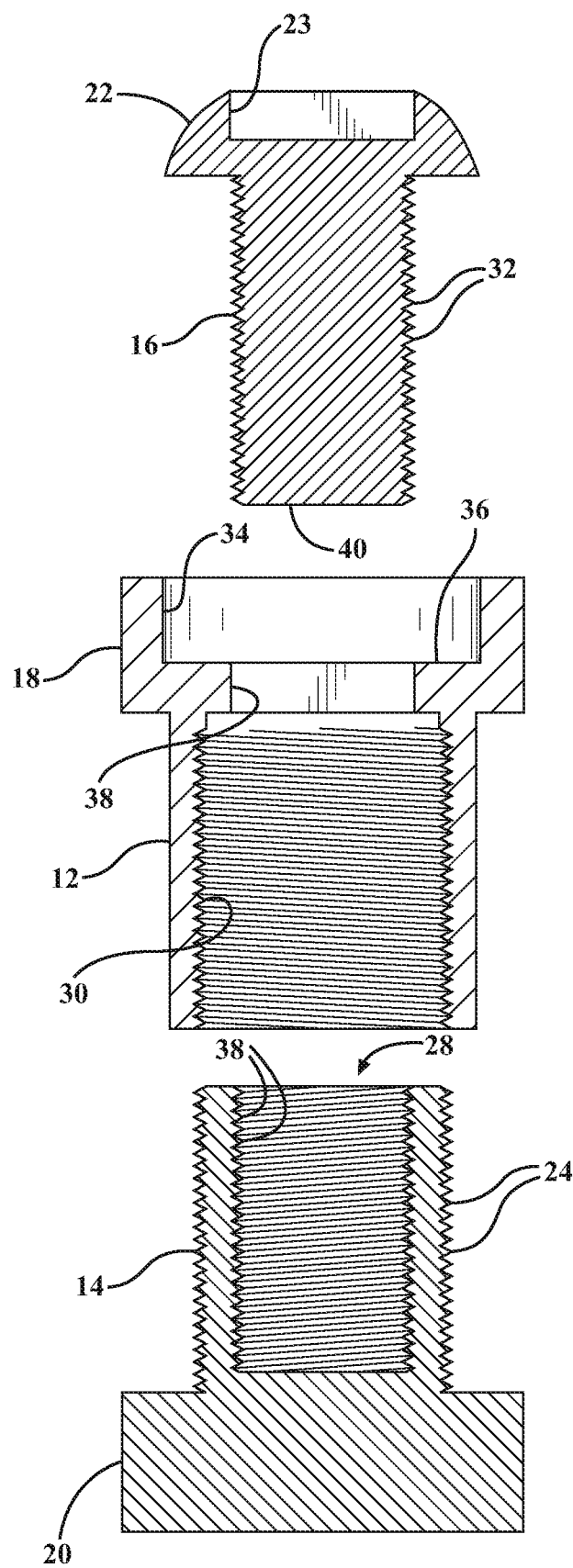
FIG. 5 is an exploded axial cutaway view corresponding to FIG. 2.

FIG. 3 is a partially exploded view of FIG. 1 and illustrating the lower or first hollowed screw 14 engaged within the lower open and interiorly threaded end of the intermediate component 12 prior to engagement of the upper or second solid screw 16. FIG. 4 is an axial cutaway view depicting the assembly of FIG. 1 and further showing first 2 and second 4 layers, each having aligning apertures depicted by inner perimeter surfaces 6 and 8, respectively, and through which a stem portion (again at 12) of the intermediate component extends. FIG. 5 further provides is an exploded axial cutaway view corresponding to FIG. 2 of the three piece fastener.

As previously described, the layers 2 and 4 are generally represented and can include any configuration or application not limited in one potential application to such as an attachment fastener for a skate blade to a flange, bracket or other support surface. In a further application, the layers 2 can correspond to an inner rim or wheel supporting a tire in attachment to a wheel hub. In each instance, the present invention serves to provide a durable fastener arrangement which resists loosening in response to vibrations and the like, such as which can be typical of dynamic operating environments.

The intermediate component includes an enlarged polygonal shaped head, such as which is depicted as a hex head configuration, see at 18, which is shown proximate its upper open end. At least one of the selected screws 14/16 (or bolt threads) likewise include an enlarged hex head which is depicted in FIG. 1 by hex head 20 associated with the lower or first bolt 14. Without limitation, the hex head can be substituted by any other circular or other type of fastening tool, such including but not limited to a multi-sided polygonal shape head having any of a triangular, square, pentagonal or other shape exhibiting a number of interconnected sides, it also being envisioned that the polygonal shaped enlarged heads can be reconfigured in other shapes consistent with the use of any tightening or loosening tool.

As also shown, the upper or second screw 16 includes a curved and enlarged diameter head 22. A tool bit engageable recess (see square profile 23) is formed in the enlarged head 22 to facilitate engagement by a tool bit (not shown) for securing the second (top) screw 16 following pre-threaded engagement of the exterior threads (at 24) of the lower screw 14 within the interior threads (at 26) of the intermediate component 12.

As further shown, the first screw 12 includes a hollow shaft (see generally at 28 in FIG. 2) exhibiting a further plurality of interior threads (further at 30) matching a direction of the first thread pattern 24. In comparison, the second screw 16 exhibits a second exterior thread pattern 32 opposite said first pattern and upon being installed within the other selected one of the opposite ends (depicted as the upper end of the intermediate component 12 in FIGS. 1-5), results in rotationally inter-engaging of the thread pattern 32 with the opposing interior thread pattern 30 of the first screw 14, with loosening of either of the first 14 and second 16 screws being prevented by their counter-threaded orientation.

Additional features include the intermediate component 12 exhibiting an end proximate undercut recess, see annular inner rim surface 34 communicated with undercut ledge 36 in FIG. 2, this for receiving and seating the enlarged head 22 of the second fastener 16 in the manner best further shown in FIG. 5. A polygonal inner perimeter (see at 38) configured in the undercut recess for communicating the solid extending stem (at 40 in FIG. 5) of the second fastener within the intermediate component 12 and into engagement with the hollow threaded interior 28 of the previously installed first fastener 14. The fasteners provided can again include, without limitation, any cross sectional shape not limited to circular or other configuration.

Figure 6:
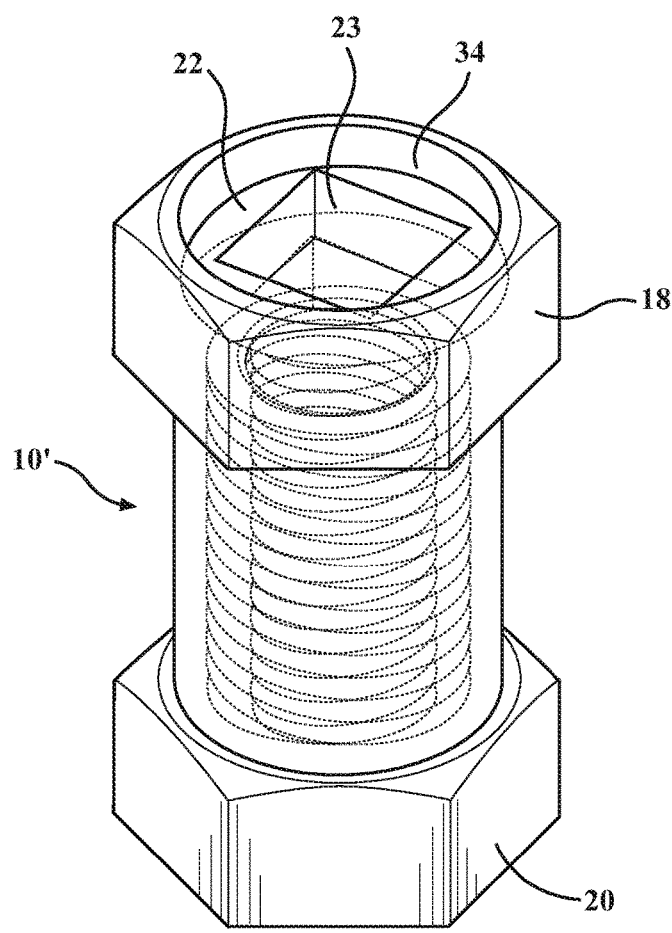
FIG. 6 is an assembled and partially transparent view of a three piece fastener as substantially shown in FIG. 1 with the direction of the first and second screw threads being reversed.
Figure 7:
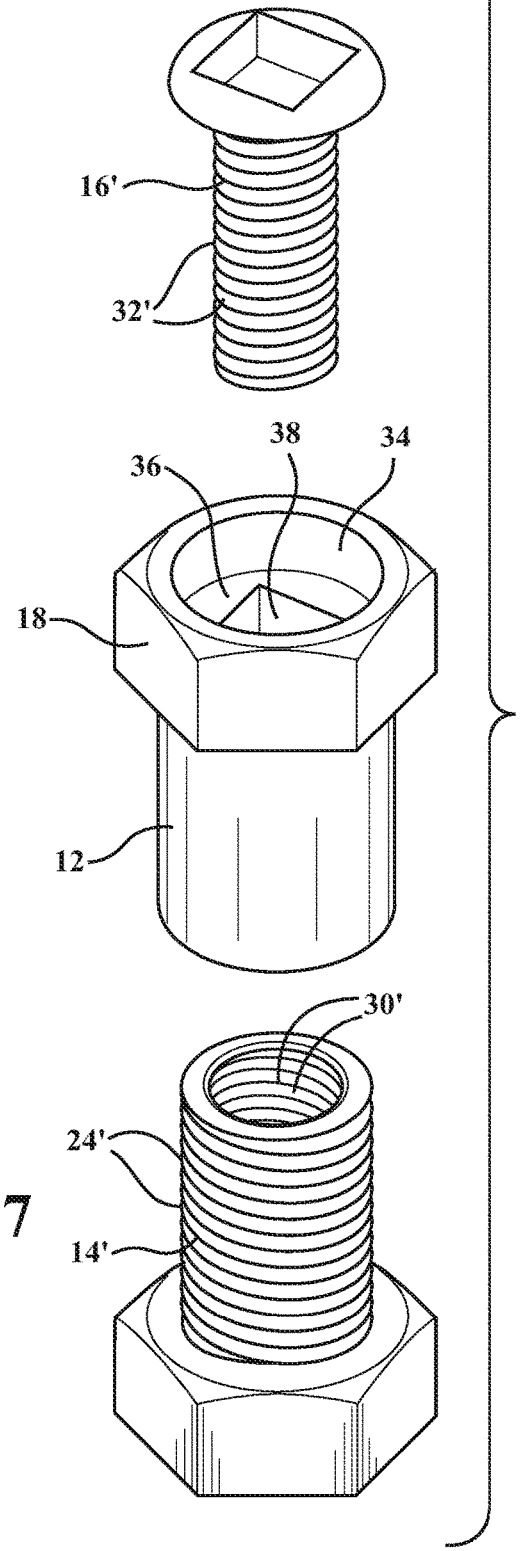
FIG. 7 is an exploded view depicting the three piece fastener of FIG. 6, similar to that previously shown in FIG. 2 and again with the intermediate component and first (bottom) hollow screw and second (top solid screw) with reversed thread patterns.

FIG. 6 is an assembled and partially transparent view of the three piece fastener as substantially shown in FIG. 1, and further depicted at 10' with the direction of the first and second screw threads being reversed as referenced by threads 24' of the first fastener, at 14' as further shown in FIG. 7, arranged in a reversed directional pattern from those depicted at 32' for second fastener 16', as also shown in FIG. 7. FIG. 7 is an exploded view depicting the three piece fastener of FIG. 6, similar to that previously shown in FIG. 2 and again with the intermediate component 12', first (bottom) hollow screw 14' and second (top solid screw) 16' with the reversed thread patterns 24' and 32'. An interior threaded pattern 30' of the intermediate component 12' (corresponding to that previously shown at 30 in FIG. 4) is likewise reversed to match that of the exterior threads 24'. Additionally, and for purposes of the present description, the reference to screw thread direction can also include the terms first/second, left/right or first and second opposing interchangeably and without limitation.

FIGS. 8-12 correspond to FIGS. 1-5 in the presentation of a three piece fastener according to a second variant of the present invention. For the purpose of clarity of description, additional figure descriptions for each of second variant of FIGS. 8-12 (and related sub-variant FIGS. 13-14), as well as the third variant of FIGS. 15-19 (and related sub-variant of FIGS. 20-21) will be limited to pointing out differences from that previously illustrated and described in the first embodiment. Similar features will remain as previously described or illustrated.

FIG. 8 is an assembled and partially transparent view of the three piece fastener according to a second variant of the present invention. FIG. 9 is an exploded view depicting the three piece fastener of FIG. 8 and, in differentiation from that shown in FIG. 1, exhibiting an alternately configured intermediate component 112 with a non-recessed upper end surface 114, this depicted in comparison to that shown in FIG. 1, in combination with the first (bottom) hollow screw 14 and second (top) solid screw 16 as previously described and exhibiting the reversed thread directions.

Figure 11:
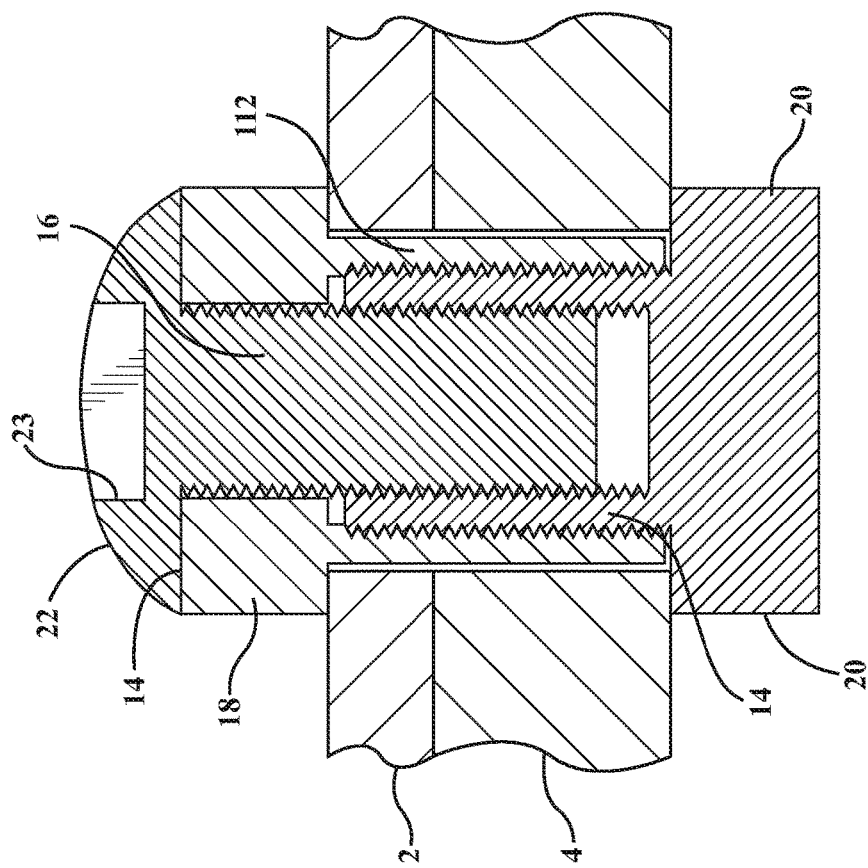
FIG. 11 is an axial cutaway view of the depicting the assembly of FIG. 8.
Figure 10:
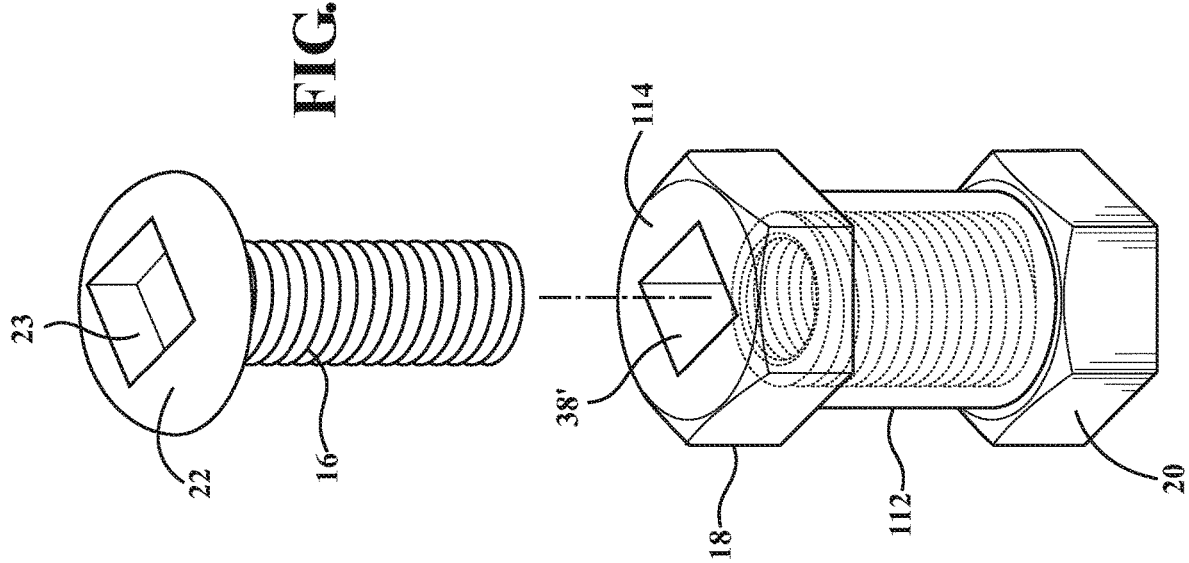
FIG. 10 is a partially exploded view of FIG. 9 and illustrating the lower or first hollowed screw engaged within the lower open and interiorly threaded end of the intermediate component prior to engagement of the upper or second solid screw.

FIG. 10 is a partially exploded view of FIG. 9 and illustrating the lower or first hollowed screw engaged within the lower open and interiorly threaded end of the intermediate component prior to engagement of the upper or second solid screw. FIG. 11 is an axial cutaway view of the depicting the assembly of FIG. 8 and in which the domed or arcuate profile 22 of the upper second screw 16 projects above the upper surface ledge 14 of the intermediate component 112 (and as opposed to being recess seated within the recess profile depicted at the upper end of the intermediate component 12 of FIG. 1 with the underside of the enlarged screw head of the second screw supported upon the undercut ledge 32 in FIG. 1).

Figure 12:
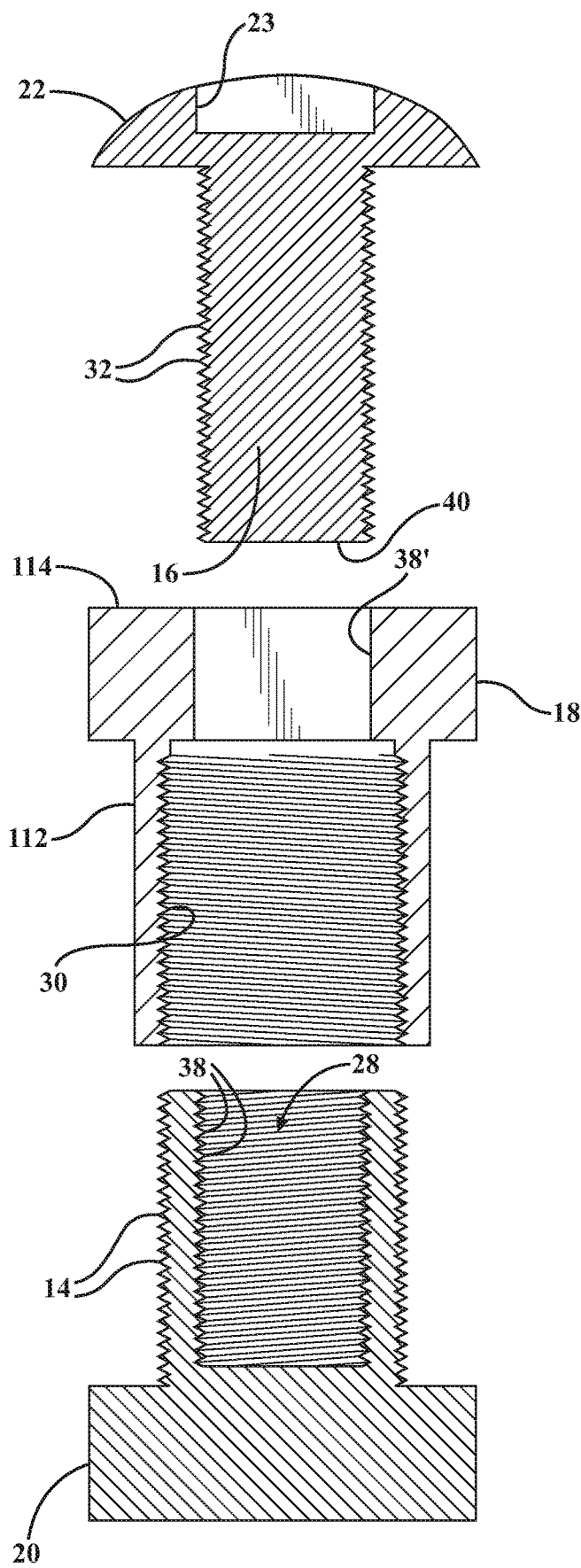
FIG. 12 is an exploded axial cutaway view corresponding to FIG. 9.

FIG. 12 is an exploded axial cutaway view corresponding to FIG. 9, with FIG. 13 depicting is an assembled and partially transparent view of a three-piece fastener as substantially shown in FIG. 8 with the direction of the first and second screw threads being reversed. A square perimeter opening 38' is referenced in the intermediate component 112 which corresponds to that shown at 38 in FIGS. 2 and 5, however is relocated more proximate the upper surface 114 of the intermediate component 112. As with the first embodiment, the dimensions of the reduced dimension square profile enable inserting passage there-through of the threaded stem or shaft 40 of the upper screw 16 (see also again FIG. 11). FIG. 14 is an exploded view depicting the three piece fastener of FIG. 9, again with the intermediate component 112 and first (bottom) hollow screw and second (top solid screw) and reverse thread patterns (see also FIGS. 6-7) exhibited on the top and bottom screws and in the same manner previously described.

Figure 15:
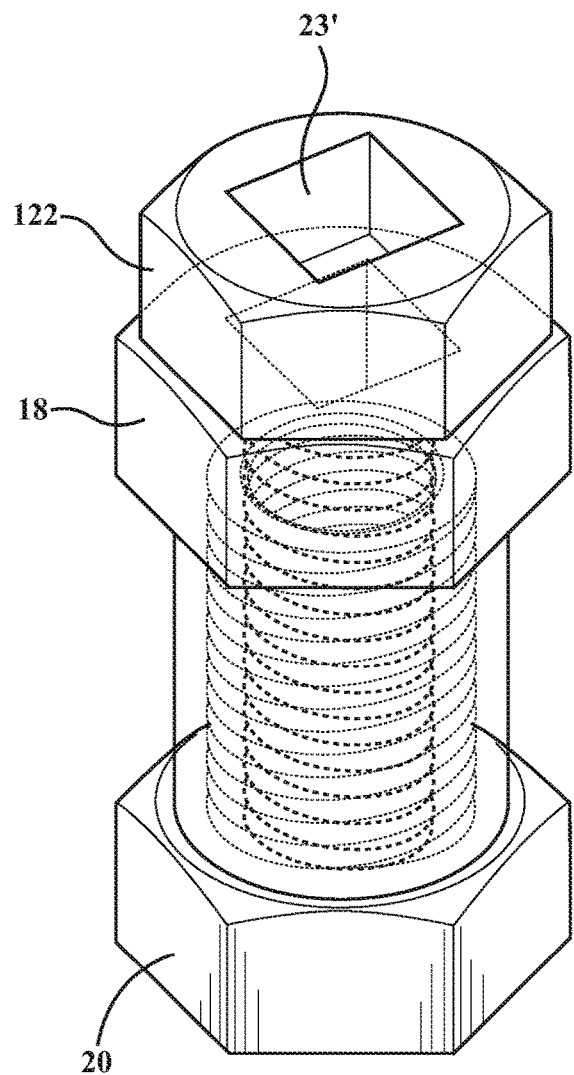
FIG. 15 is an illustration similar to previous FIGS. 1 and 8 of an assembled and partially transparent view of a three piece fastener according to a third variant of the present invention.
Figure 16:
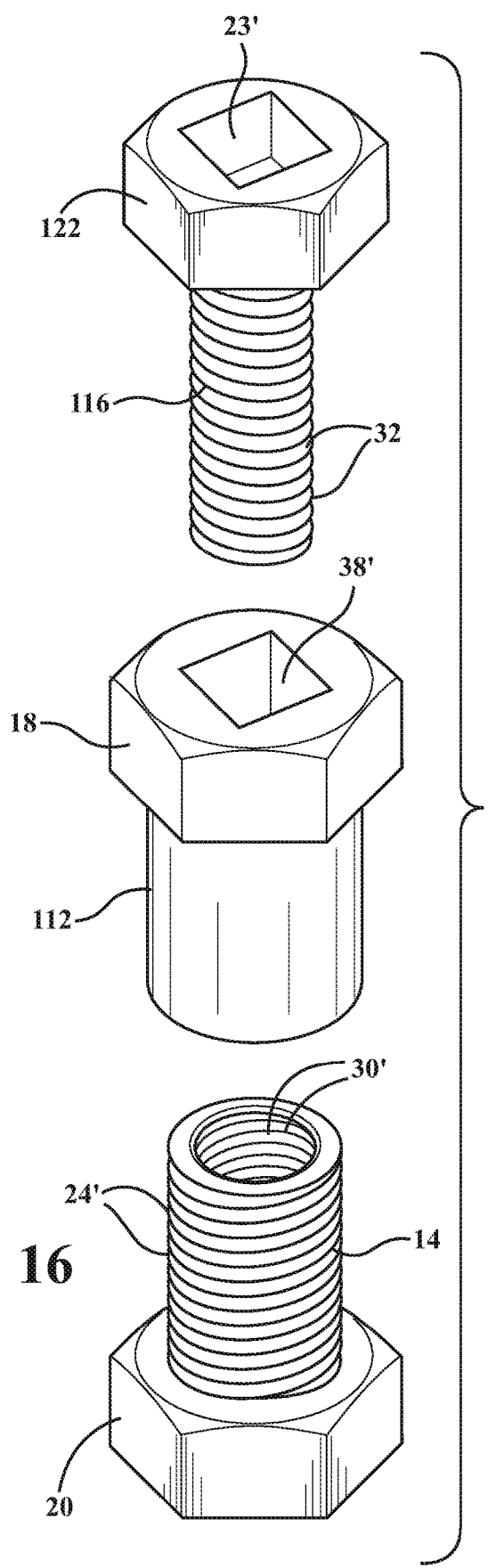
FIG. 16 is an exploded view depicting the three piece fastener of FIG. 15 with the intermediate component and first (bottom) hollow screw and second (top solid screw), the second top screw being alternately configured from that shown in FIG. 9.

FIG. 15 is an illustration similar to previous FIGS. 1 and 8 of an assembled and partially transparent view of a three-piece fastener according to a third variant of the present invention. FIG. 16 is an exploded view depicting the three-piece fastener of FIG. 15 with the intermediate component 112 and first (bottom) hollow screw 14 as depicted in FIG. 9, the second (top) solid screw being alternately configured from that shown at 16 in FIG. 9, and as further shown at 116 in FIG. 16. In particular, the domed head 22 of the second screw 116 is reconfigured in this variant as a hex head 122 with a flat upper surface within which is configured the tool bit engaging square recess pattern 23' reconfigured within the hex head 122.

Figure 18:
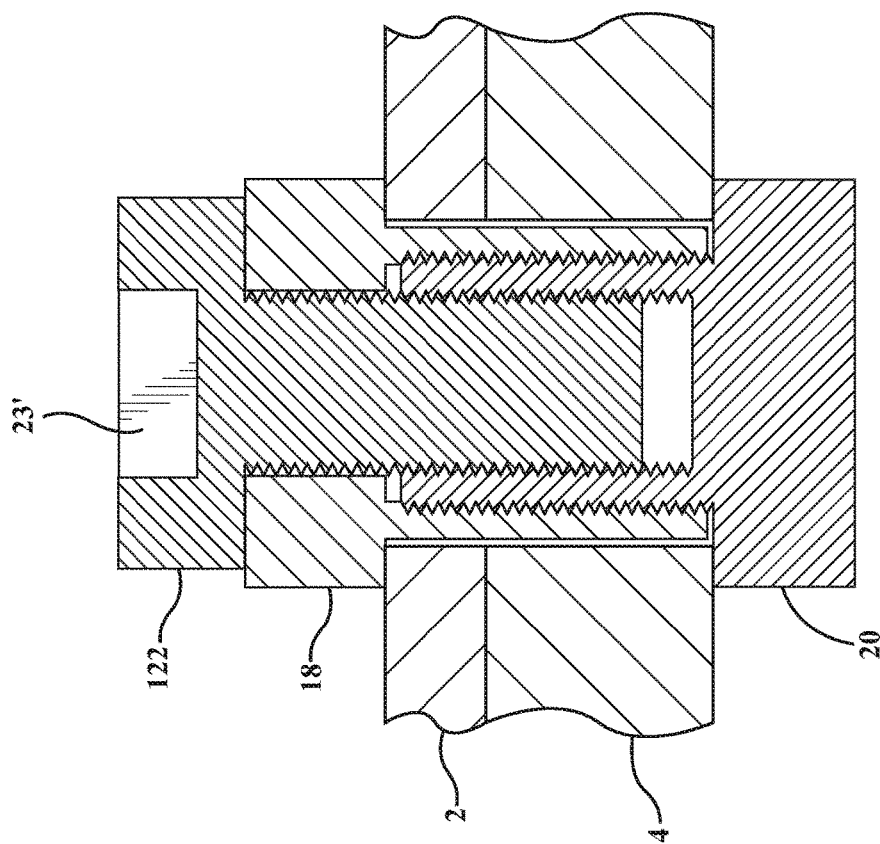
FIG. 18 is an axial cutaway view depicting the assembly of FIG. 15.
Figure 17:
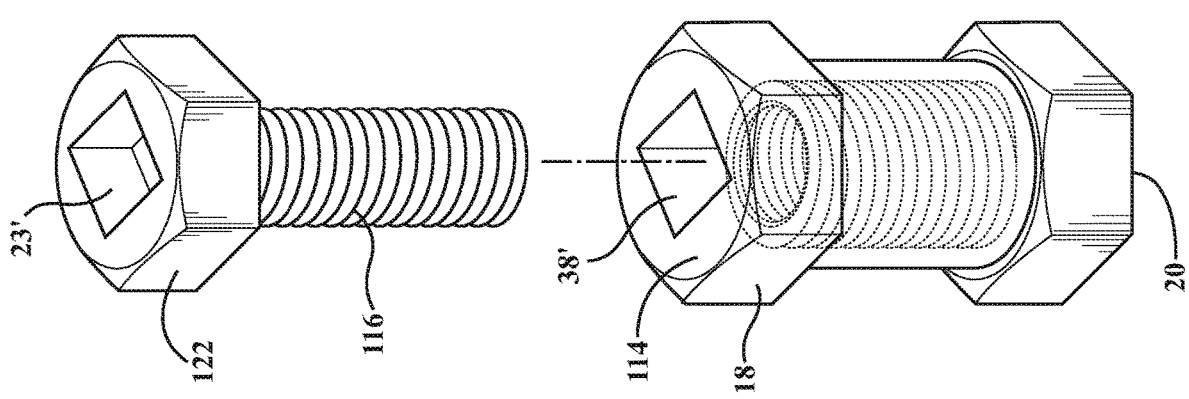
FIG. 17 is a partially exploded view of FIG. 15 and illustrating the lower or first hollowed screw engaged within the lower open and interiorly threaded end of the intermediate component prior to engagement of the upper or second solid screw.
Figure 19:
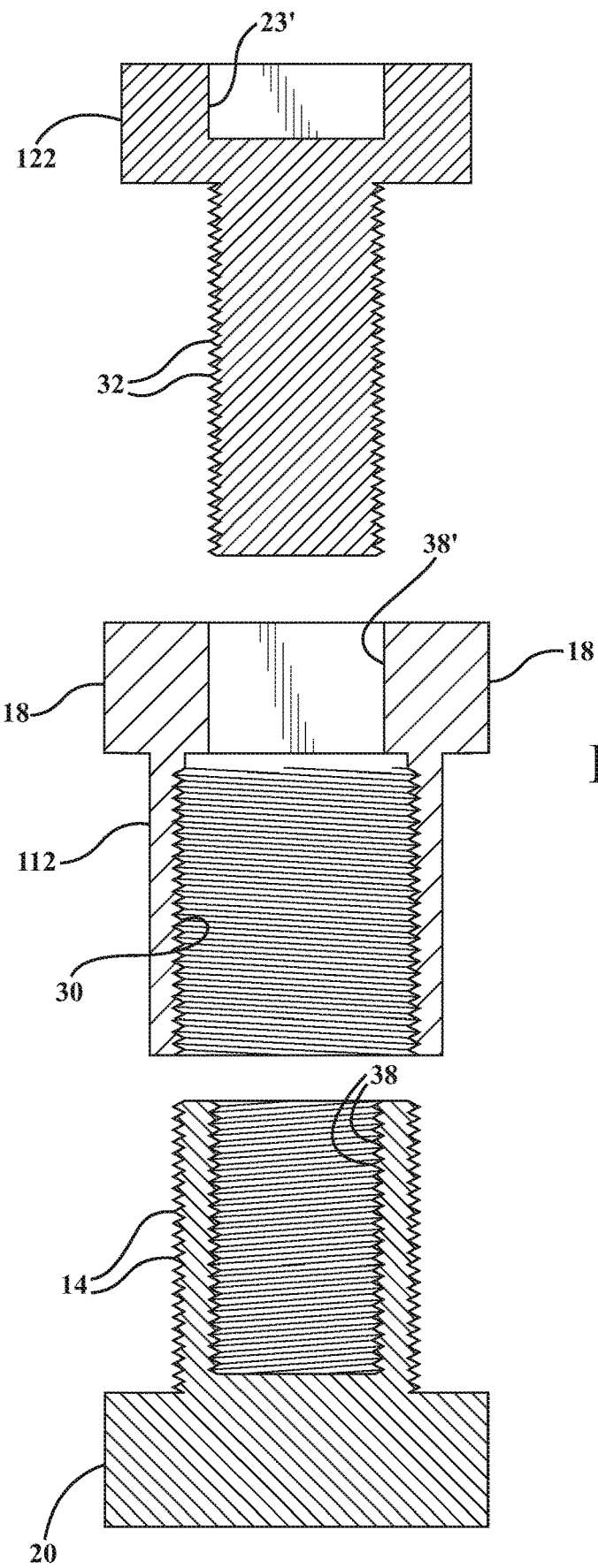
FIG. 19 is an exploded axial cutaway view corresponding to FIG. 16.

FIG. 17 is a partially exploded view of FIG. 15 and illustrating the lower or first hollowed screw 14 engaged within the lower open and interiorly threaded end of the intermediate component 112 prior to engagement of the upper or second solid hex head screw 122. FIG. 18 is an axial cutaway view of the depicting the assembly of FIG. 15, with FIG. 19 providing an exploded axial cutaway view corresponding to FIG. 16.

Figures 20, 21:
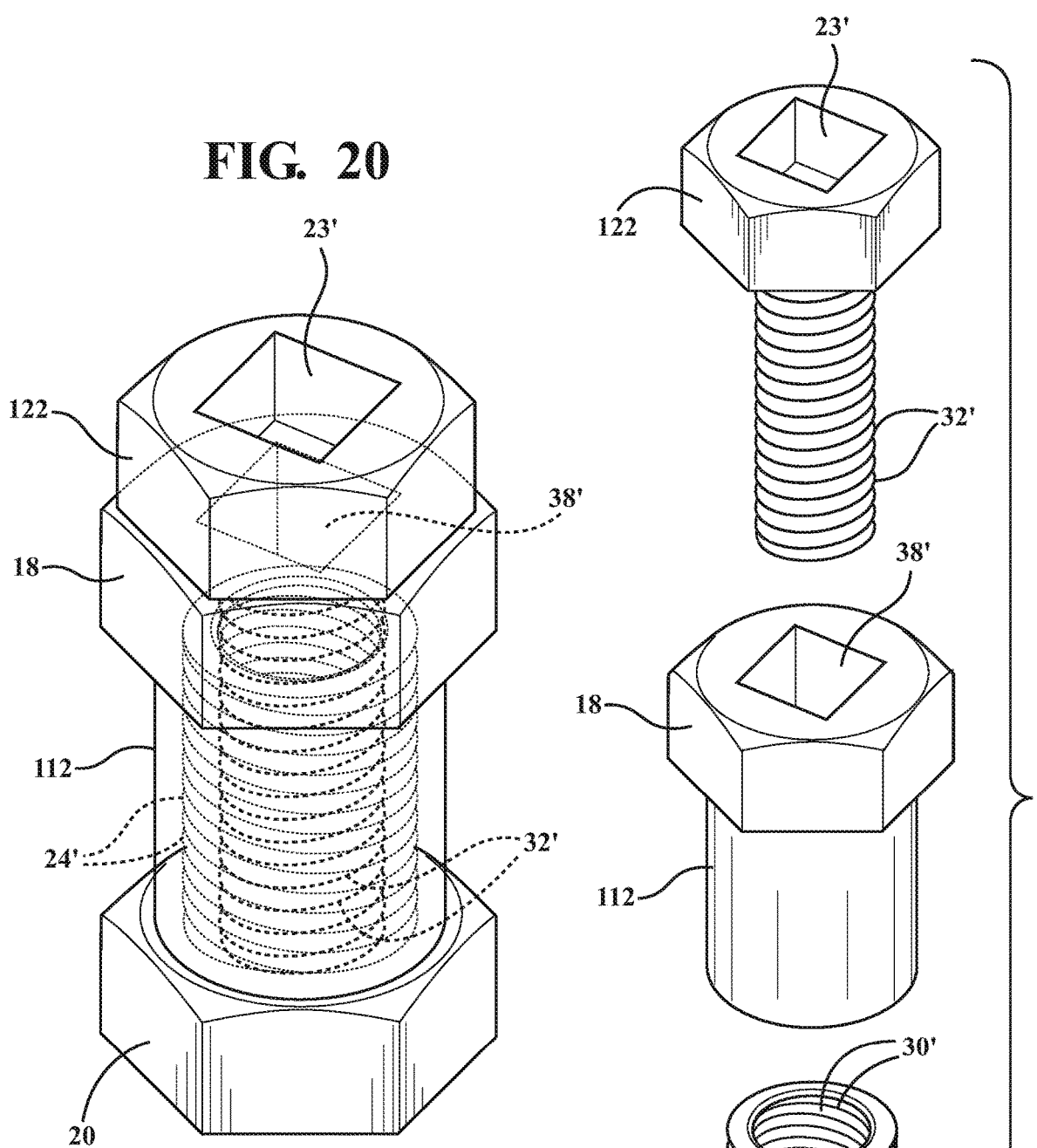
FIG. 20 is an assembled and partially transparent view of a three piece fastener as substantially shown in FIG. 15 with the direction of the first and second screw threads being reversed.
FIG. 21 is an exploded view depicting the three piece fastener of FIG. 20, similar to that previously shown in FIG. 16 and again with the intermediate component and first (bottom) hollow screw and second (top solid screw) with reversed thread patterns.

FIG. 20 is an assembled and partially transparent view of a three piece fastener as substantially shown in FIG. 15 with the direction of the first and second screw threads being reversed, this further depicted in the exploded view of FIG. 21 with reversed thread patterns as previously shown in corresponding FIG. 7 (first variant) and FIG. 14 (second variant).

Referring now to FIG. 22, an assembled and partially transparent view is generally shown at 130 of a three-piece fastener according to a further embodiment of the present invention. As additionally shown in the exploding and axial cutaway views in succeeding FIGS. 23-25, the three-piece fastener includes intermediate component 132 and first (bottom) hollow screw 134 and second (top) solid screw 136.

As with the preceding variant, the intermediate component 132 and first 134 and second 136 fasteners can be constructed of any rigid material not limited to steel, carbon steel or any durable composite (e.g. nylon or polymer) material. As further understood, the screws 134 and 136 are also commonly termed as "threaded bolts" however can include any other suitable configuration for inter-engaging with the intermediate component 132 in the manner described herein.

Figure 24:
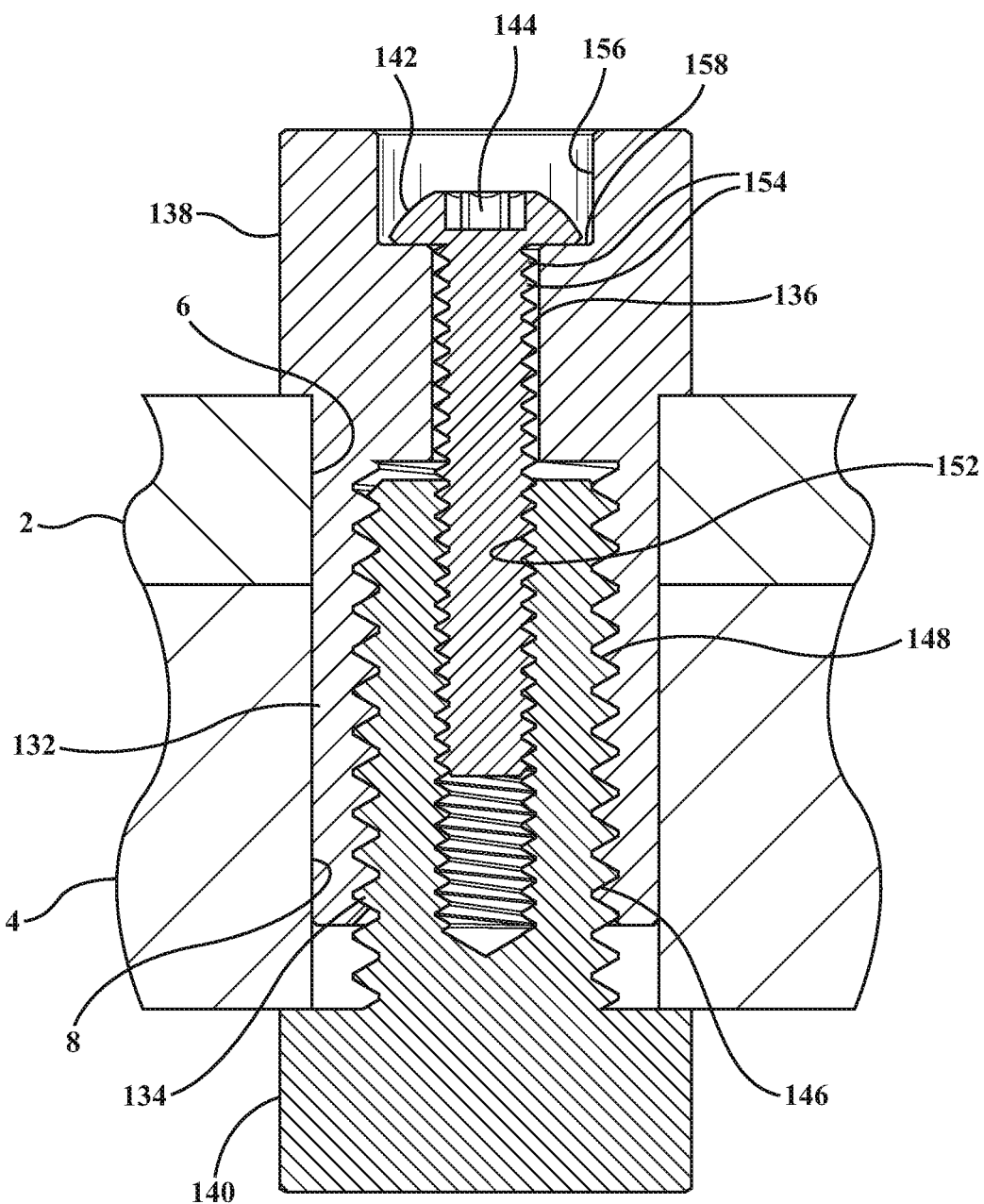
FIG. 24 is an axial cutaway view depicting the assembly of FIG. 22.
Figure 25:
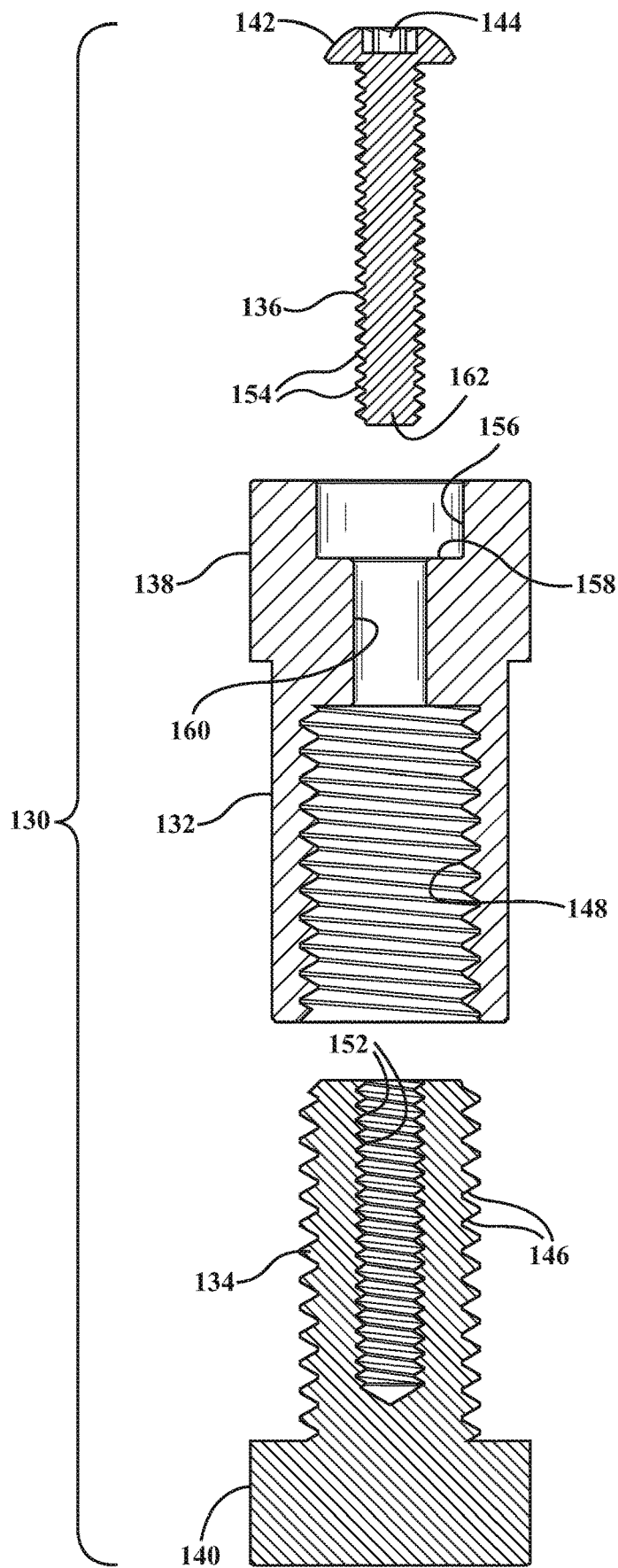
FIG. 25 is an axial cutaway of the exploded view of FIG. 23.

FIG. 24 provides an axial cutaway view depicting the assembly of FIG. 22 and further showing the first 2 and second 4 layers (see also FIG. 4) being secured together, each having aligning apertures again depicted by inner perimeter surfaces 6 and 8, respectively, and through which the stem portion (again at 132) of the intermediate component extends. FIG. 25 further provides is an exploded axial cutaway view corresponding to FIG. 23 of the three-piece fastener 130.

As previously described, the layers 2 and 4 are generally represented and can include any configuration or application not limited in one potential application to such as an attachment fastener for a skate blade to a flange, bracket or other support surface. As also previously described, and in a further application, the layers 2 and 4 can correspond to an inner rim or wheel supporting a tire in attachment to a wheel hub such that the present invention serves to provide a durable fastener arrangement which resists loosening in response to vibrations and the like, such as which can be typical of dynamic operating environments.

The intermediate component 132 includes an enlarged polygonal shaped head, such as which is depicted as a hex head configuration at 138, which is shown proximate its upper open end. At least one of the selected screws 134/136 (also again termed bolt threads) likewise include an enlarged hex head which is depicted in FIG. 22 by hex head 140 associated with the lower or first bolt 134. As further again shown in FIG. 24, the opposing inner ledge surfaces created by the enlarged hex heads 138 and 140 provide the sandwiching force to the proximate aperture surface perimeter locations of the layers 2/4 in the environmental illustration shown. Without limitation, the hex head can again be substituted by any other multi-sided polygonal shape head, not limited to any of a triangular, square, pentagonal or other shape exhibiting a number of interconnected sides, and it is also again envisioned that the polygonal shaped enlarged heads can be reconfigured in other shapes consistent with the use of any tightening or loosening tool.

The upper or second screw 136 includes a curved and enlarged diameter head 142. A tool bit engageable recess (see as including a star profile 144 also known as a Torx style screw by non-limiting example) is formed in the enlarged head 142 to facilitate engagement by a tool bit (not shown) for securing the second (top) screw 136 following pre-threaded engagement of the exterior threads (at 146) of the lower screw 134 within the interior threads (best shown at 148 in FIG. 25) of the intermediate component 132.

As further shown, the first screw 132 includes a hollow shaft (see generally at 150 in FIG. 23) exhibiting a further plurality of interior threads (further at 152) matching a direction of the first thread pattern 146. In comparison, the second screw 136 exhibits a second exterior thread pattern 154 which is opposite the first pattern and, upon being installed within the other selected one of the opposite ends (depicted as the upper end of the intermediate component 132), results in rotationally inter-engaging of the thread pattern 154 with the opposing interior thread pattern 152 of the first screw 134, with loosening of either of the first 134 and second 136 screws being prevented by virtue of their counter-threaded orientation.

Additional features include the intermediate component 132 exhibiting an upper end proximate undercut recess, see annular inner rim surface 156 communicated with undercut ledge 158, this for receiving and seating the enlarged head 142 of the second fastener 136 in the shown in FIGS. 22 and 24. A circular inner perimeter (see at 160) is configured in the undercut recess for communicating the solid extending stem (at 162) of the second fastener 136 within the open interior of the intermediate component 132 and into engagement with the hollow threaded interior 150 of the previously installed first fastener 134 according to the previously described counter-threaded and loosening preventative manner.

Figure 26:
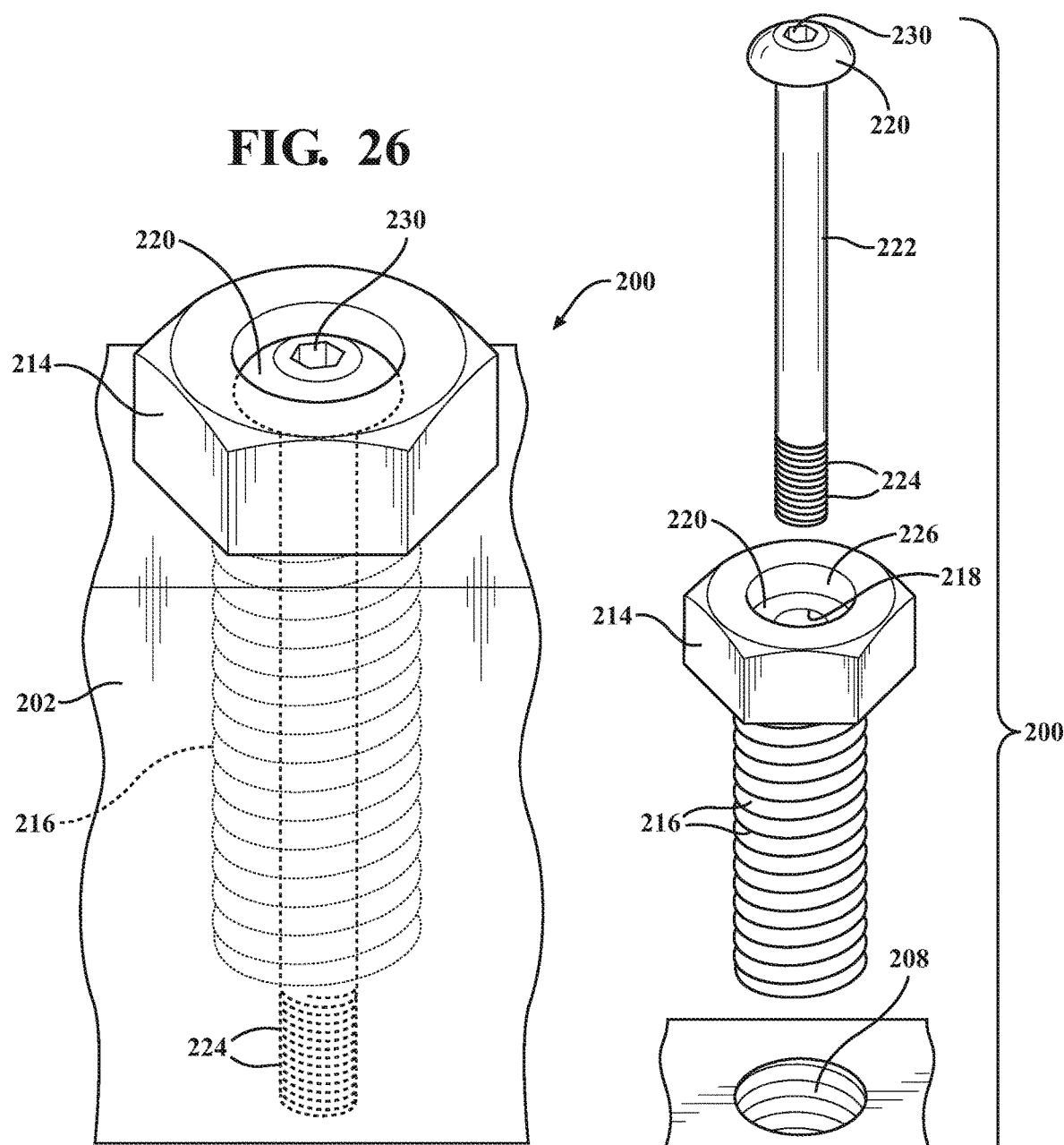
FIG. 26 is an assembled and partially transparent view of a multi-piece fastener according to a further embodiment of the present invention.
Figure 27:
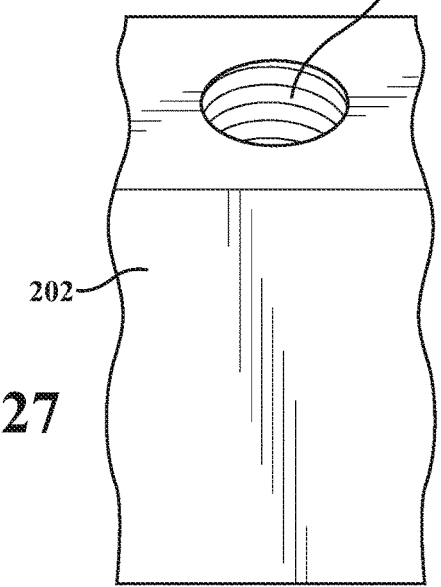
FIG. 27 is an exploded view of the multi-piece fastener of FIG. 26 and depicting each of a thickened base layer with first and second successive and counter threaded interior profiles, a first wider diameter bolt style fastener and second interiorly seating and narrower diameter bolt style fastener.
Figure 34:
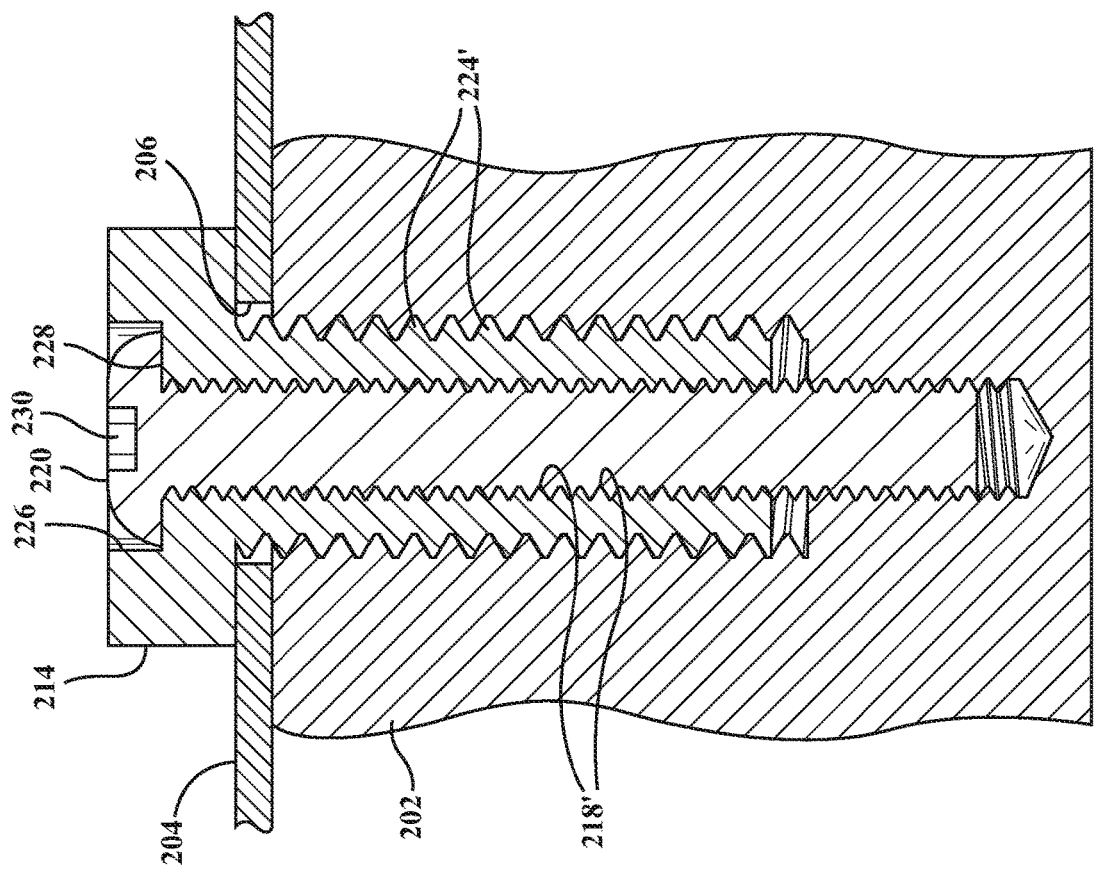
FIG. 34 is an axial cutaway depicting the exploded assembly of FIG. 31.
Figure 33:
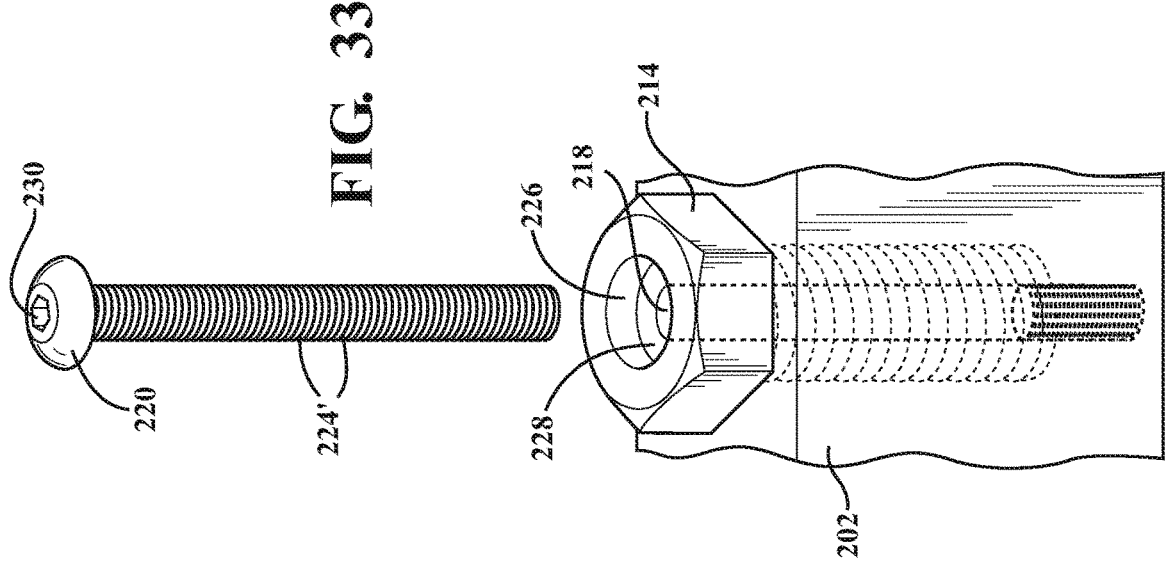
FIG. 33 is a succeeding illustration to FIG. 32 and depicting the wider diameter fastener installed within the base layer in a preliminary assembly step.

Proceeding to FIGS. 26 and 27, a first assembled and partially transparent view and a second exploded view respectively are generally shown at 200 of a multi-piece fastener assembly according to a further embodiment of the present invention. A base layer 202 forms part of the fastener assembly and, along with the first and second elongated fasteners to be further described, includes without limitation any of steel, other metal (e.g. aluminum or the like) or other rigid material further including but not limited to a heavy duty nylon or other material which would avoid stripping of its threaded interfaces in response to forces exerted upon the fastener assembly. The base layer 202 is further contemplated to exhibit a sufficient depth dimension as required for receiving the first and second bolt style fasteners as will be further described and to secure such as a second thinner surface layer, see at 204 in FIGS. 29 and 34 and such as which can further include an inner rim 206 defining aperture sized for receiving the diameter of the stem associated with the first bolt fastener.

Figure 29:
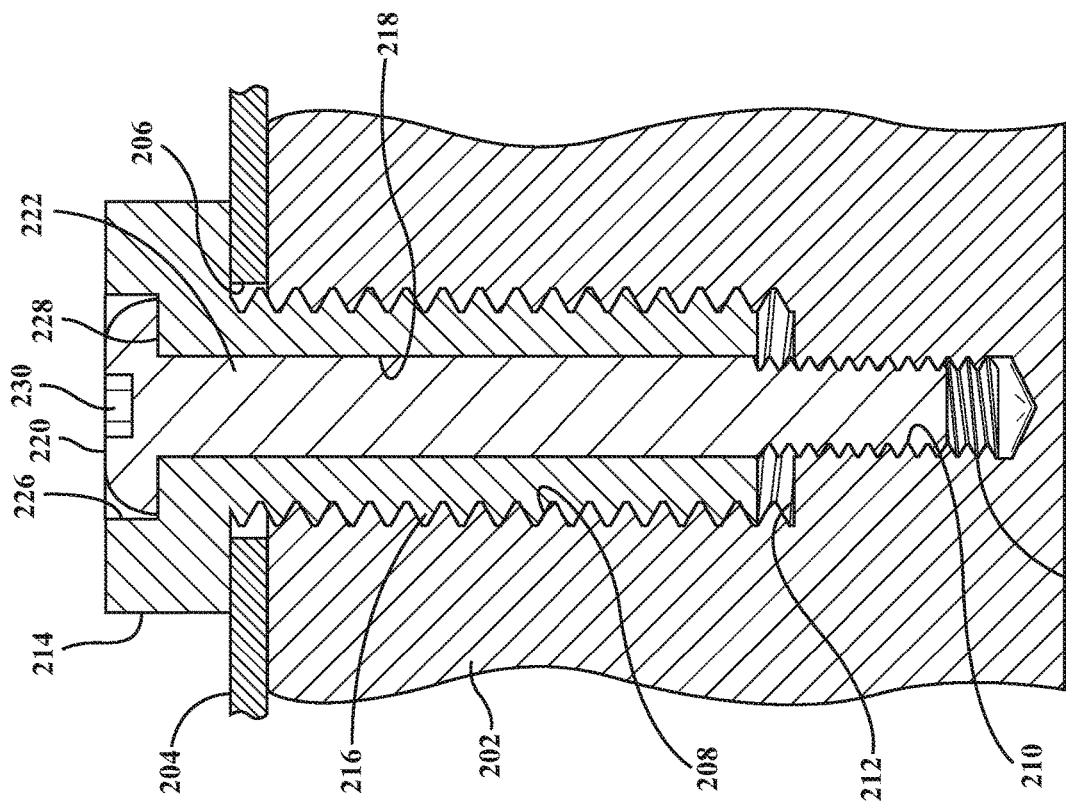
FIG. 29 is an axial cutaway depicting the exploded assembly of FIG. 26.
Figure 28:
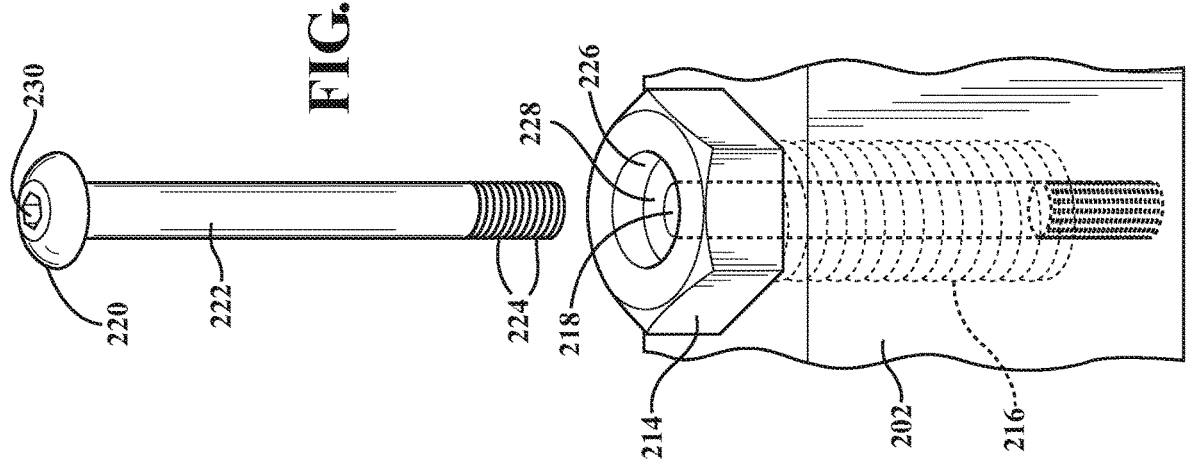
FIG. 28 is a succeeding illustration to FIG. 27 and depicting the wider diameter fastener installed within the base layer in a preliminary assembly step.
Figure 30:
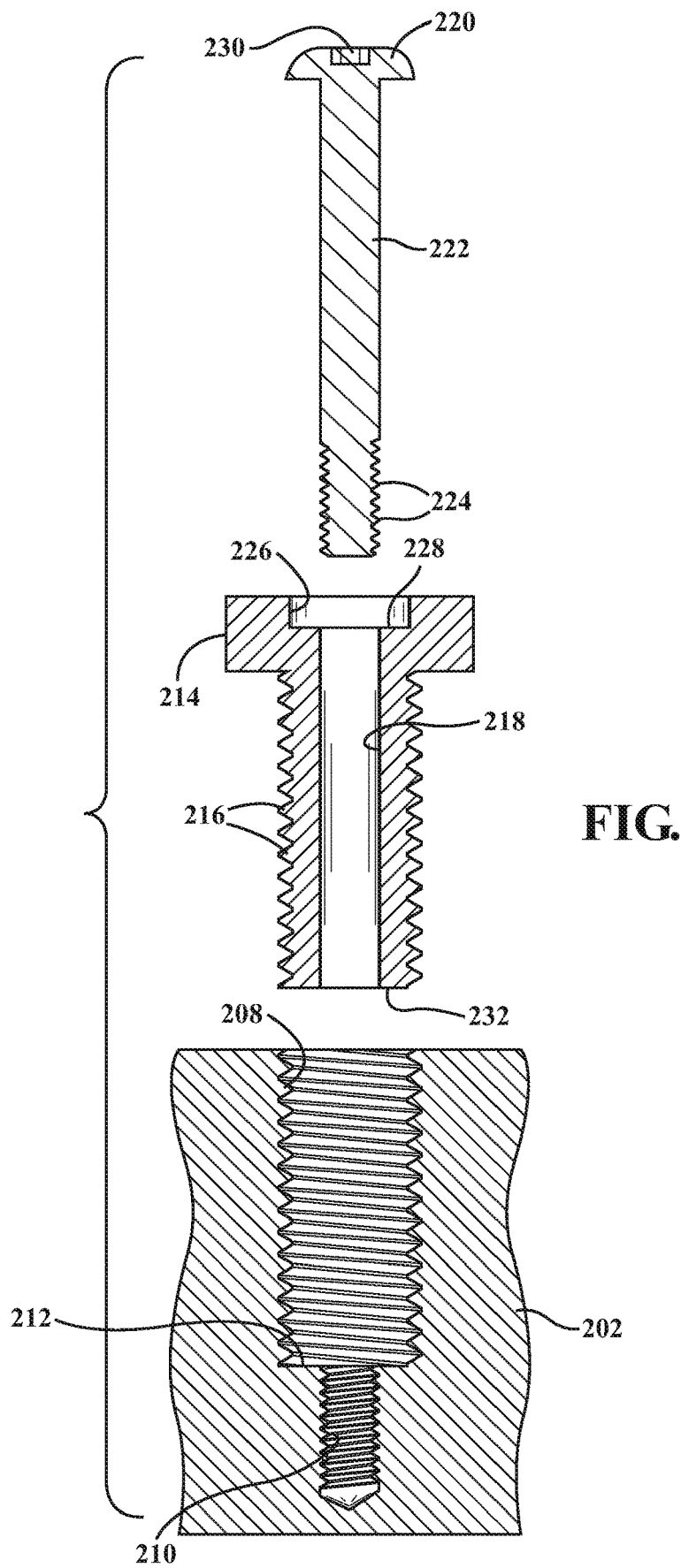
FIG. 30 is an axial cutaway depicting the assembly of FIG. 27.

The base layer 202 is configured with a first wider diameter and interior rim edge defining passageway which exhibits a first interiorly threaded orientation 208 (see FIGS. 27, 29 and 30). A second narrower diameter passageway exhibits a second opposite threaded orientation 210 (see as best shown in FIGS. 29-30) and extends a selected distance in communication with and beyond a bottom end wall 212 of the first wider passageway 208.

Figure 35:
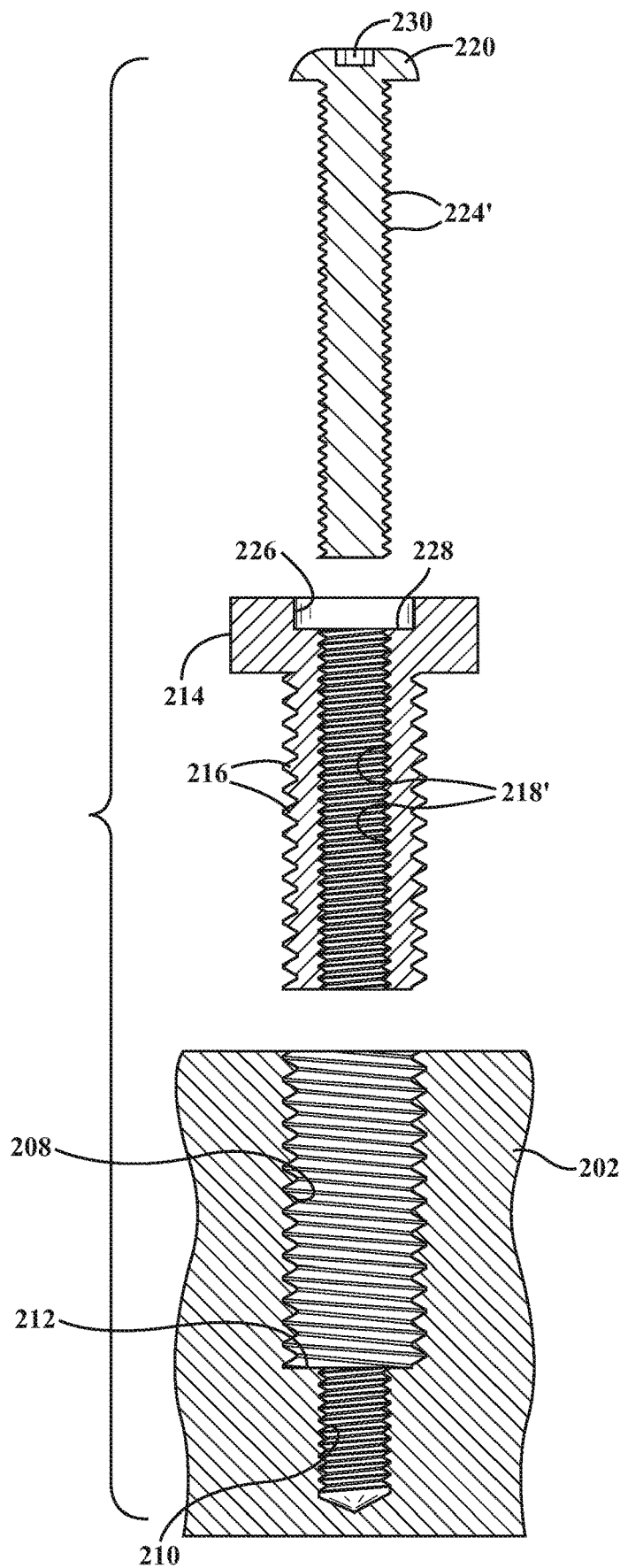
FIG. 35 is an axial cutaway depicting the assembly of FIG. 32.

A first redesigned elongated and wider diameter bolt style fastener includes an enlarged head 214, such as which can be provided as a hex head configuration and which upon being installed compresses the second layer 204 against the first base layer 202 (again FIG. 29). The wider diameter bolt style fastener also includes an integrally formed stem having a first arrangement of exterior threads 216 which are threadably inter-engageable with the interior rim edge oriented threads 208 configured within the wider diameter passageway of the base layer 202. The first fastener further includes a further interior passageway (see as best shown in axial cutaway of FIG. 30 by inner rim defining wall 218 extending the axial length of the head 214 and threaded stem 216. As further shown, the interior passageway 218 can be a smooth surface (with further reference to the alternate variant in FIG. 35 such alternately exhibiting counter oriented threads and which can be optionally threaded along any of a partial or entire length in a counter direction relative to the exterior threads 216).

A second narrower diameter bolt style fastener includes a head 222 (depicted as rounded) and an extending stem 222 which can be partially or fully threaded, see at 224 along end-most portion of the stem 222. A recessed or annular undercut is provided in the upper surface of the enlarged head 214 of the wider bolt (see as shown by annular recessed side rim 226 and interconnected recessed end wall 228 which are dimensioned to seat the head 220 of the inner diameter fastener in a substantially flush manner). The inner diameter fastener head 220 further includes a bit receiving upper end recess (see profile 230) which can include without limitation a configuration for receiving a standard Allen style wrench (not shown).

Following the wider diameter fastener being installed into the base layer 202 to secure there-against the second and typically thinner layer 204 (see again FIG. 29), the second fastener stem 222 is dimensioned to be installed through the interior passageway 218. Upon being fully installed, the threaded 224 end most portion of the inner fastener stem 222 projects beyond a stem end face 232 (see as best shown in FIG. 30) of the wider fastener and abutting end wall 212 of the wider interior passageway configured within the base layer 202, with the threaded narrowed stem portion 224 threadably inter-engaged with the further extended counter oriented threads 210 defining the progressing second narrower diameter passageway. In this manner, loosening of either the opposing coaxial seating outer wider and inner narrowed bolt fasteners is prevented via their counter-threaded orientations.

Figure 31:
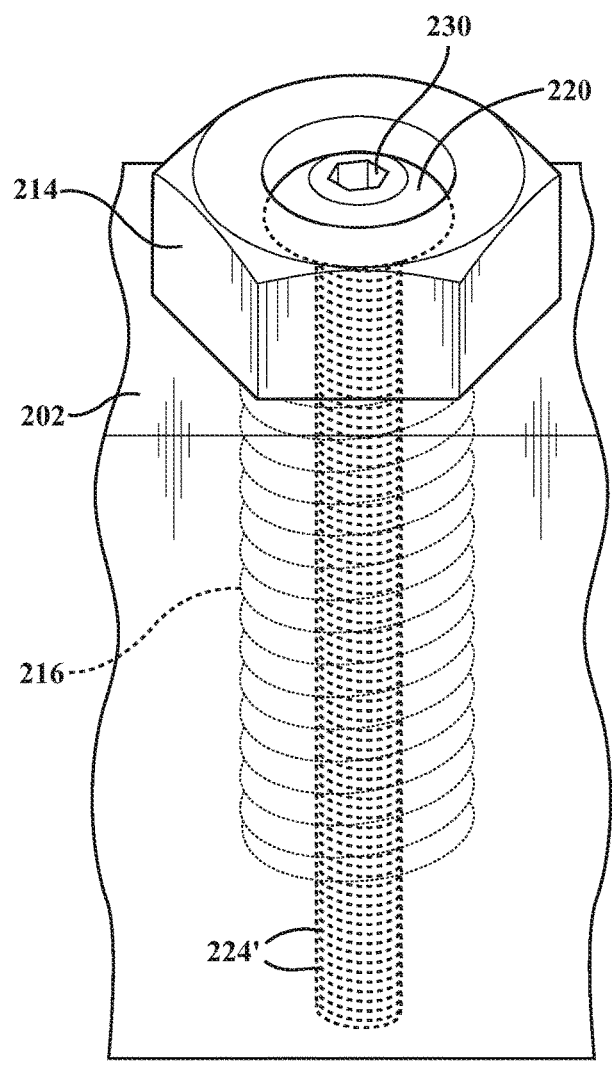
FIG. 31 is an assembled and partially transparent view of a multi-piece fastener according to a sub-variant of the further embodiment of FIG. 26.
Figure 32:
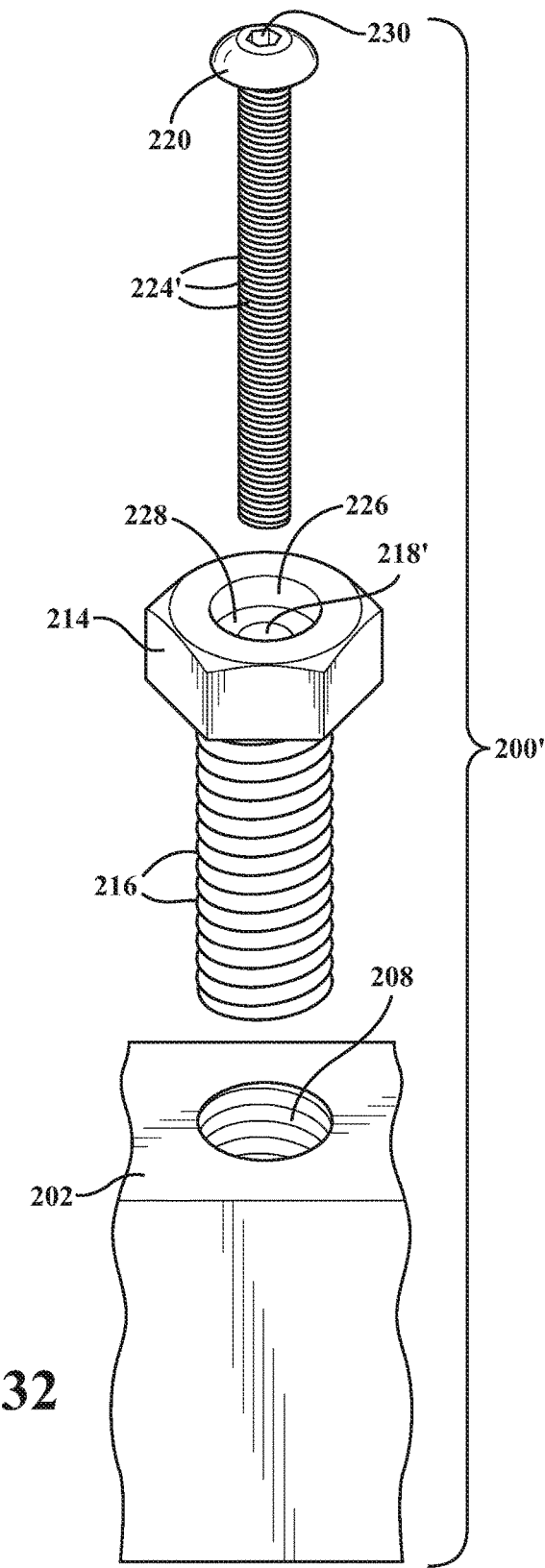
FIG. 32 is an exploded view of the multi-piece fastener of FIG. 31 and depicting each of a thickened base layer with first and second successive and counter threaded interior profiles, a first wider diameter bolt style fastener and second interiorly seating and narrower diameter bolt style fastener, the narrow diameter bolt including an exteriorly threaded stem in comparison to the non-threaded stem of the inner diameter bolt shown in FIG. 27.

FIGS. 31 and 32 present each of a first assembled and partially transparent view and a second exploded view respectively at 200' of a multi-piece fastener according to a sub-variant of the embodiment 200 of FIGS. 26-30. Identical features to that shown in FIGS. 26-30 are repetitively numbered without further explanation.

In comparison to the prior version 200 the variant 200' depicts a reconfiguration of the wider and narrow diameter bolt fasteners such that the wider fastener exhibits a threaded interior passageway 218' (see FIGS. 34-35) this in comparison to the smooth edged rim defining passageway 218 shown previously in FIGS. 29-30. The second narrowed diameter bolt fastener further exhibits a reconfiguration of the counter oriented exterior threads 224' extending along an entire length of the stem (compare at 222 in FIG. 27 with only partial end most disposed threads 224).

The interior passageway defined thread pattern 218' of the wider fastener is configured to receive the reconfigured exterior threads 224' prior to successive inter-engagement of the lower end-most threaded portion 224' of the inner diameter bolt fastener with the inner diameter end-most extending and likewise counter oriented threads 210, these again configured in the base layer 202 beyond the first outer threaded orientation 208 and interconnecting bottom end wall 212 and which are in a same orientation as the exterior threads 224' reconfigured upon the annular outer profile of the inner diameter bolt fastener. As with the prior variant 200, the inner diameter bolt fastener is fully installed with the bottom of the head 220 is seated flush within the undercut recess (side annular wall 226 and bottom recessed wall 228) defined in the larger head 214 of the wider diameter bolt fastener.

The addition of the inter-engaging exterior threads 224' of the inner diameter bolt fastener and opposing interior passageway threads 218' of the outer diameter fastener are intended to provide variable torque resistance values as compared to the variant depicted in FIGS. 26-30. That said, the present invention contemplates any or no degree of threading between the opposing mating profiles established between the inner and outer bolt fasteners, so long as at least an end-most portion of the inner bolt fastener is threaded (as again previously shown at 224 in FIG. 27) for inter-engagement with the threaded profile 210 in the base layer 202 (in turn counter-threaded to the outer diameter profile 208 for receiving the exterior threads 216 of the outer or wider diameter bolt fastener.

Accordingly, the present fastener assembly provides superior resistance to loosening of the fastener assembly, such as in response to extended vibrations or other external/environmental factors which can cause loosening of prior art fastener designs, even with the use of spring washers or the like.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The invention claimed is:

1. A locking fastener assembly, comprising:
   a base layer within which is configured a first wider diameter passageway exhibiting a first interiorly threaded orientation, a second succeeding and narrower diameter passageway exhibiting a second opposite threaded orientation extending a selected distance beyond a bottom end wall of said first wider passageway;
   a first elongated fastener including a first head and a first stem exhibiting a first arrangement of exterior threads threadably inter-engageable with said first interiorly threaded orientation of said base layer, said first elongated fastener further including an interior passageway extending its axial length;

said first head of said first elongated fastener further comprising a multi-sided polygonal configuration with an undercut recess profile including an annular side wall and interconnected and non-beveled bottom recessed wall arrayed in communication with said interior passageway;

a second elongated and narrower diameter fastener having a second head and a second stem including a second arrangement of exterior threads which are located at least along an end-most portion of said second stem and which are counter oriented to said first arrangement of exterior threads of said first fastener;

said second head exhibiting a curved and enlarged diameter having a bit receiving recess and a flattened underside surface which, upon installation within said first fastener and into said narrower diameter passageway of said base layer, causing said second head to seat within said undercut recess of said first head so that said flattened underside of said second screw head abuts said non-beveled bottom recessed wall of said first head and said curved and enlarged diameter does not project above said first head; and following said first elongated fastener being installed into said base layer and so that said first head is adapted to secure any second layer against said base layer, said second fastener being installed through the interior passageway of said first fastener and so that said counter threaded end-most portion threadably engages with said second succeeding and narrower diameter passageway of said base layer, loosening of either of said first and second fasteners being prevented by their counter-threaded orientation.

2. The fastener assembly of claim 1, said interior passageway of said first elongated fastener further comprising interior threads orientated for inter-engagement with said second arrangement of threads upon said second stem of said second fastener.

3. The fastener assembly of claim 2, further comprising said second arrangement of exterior threads extending a length of said second stem.

4. The fastener assembly of claim 1, further comprising said base layer and said first and second fasteners each further comprising a rigid material not limited to a steel or heavy-duty nylon construction.

5. A locking fastener assembly, comprising:
a base layer having a smooth upper surface within which is configured a blind hole including a first wider diameter passageway exhibiting a first interiorly threaded orientation and a second succeeding and narrower diameter passageway exhibiting a second opposite threaded orientation extending a selected distance beyond a bottom end wall of said first wider passageway;

a second thinner surface layer positioned over said base layer and having an inner rim defining aperture aligning with said blind hole;

a first elongated fastener including a first head and a first stem exhibiting a first arrangement of exterior threads extending a length of said first stem and which is threadably inter-engageable with said first interiorly threaded orientation of said base layer, said first elongated fastener further including an interior passageway extending its axial length;

said first head of said first elongated fastener further comprising a multi-sided polygonal configuration with an undercut recess profile including an annular side wall and interconnected bottom recessed wall arrayed in communication with said interior passageway;

a second elongated and narrower diameter fastener having a second head and a second stem including a second arrangement of exterior threads extending along a length of said second stem and which are counter oriented to said first arrangement of exterior threads of said first fastener;

said second head exhibiting a curved and enlarged diameter head having a bit receiving recess and a flattened underside surface which, upon installation within said first fastener and into said narrower diameter passageway of said base layer, causing said second head to seat within said undercut recess of said first head so that said flattened underside of said second screw head abuts said recessed wall of said first head and said curved and enlarged diameter does not project above said first head; and following said first elongated fastener being installed into said base layer and so that said first head is adapted to abut and secure said second layer against said base layer, said second fastener being installed through the interior passageway of said first fastener and so that said second arrangement of threads engage with said second succeeding and narrower diameter passageway of said base layer, loosening of either of said first and second fasteners being prevented by their counter-threaded orientation.

* * * * *